United States Patent
Miyazaki et al.

(10) Patent No.: US 7,600,072 B2
(45) Date of Patent: Oct. 6, 2009

(54) PERFORMANCE REPORTING METHOD CONSIDERING STORAGE CONFIGURATION

(75) Inventors: Fumi Miyazaki, Fujisawa (JP); Yuichi Taguchi, Sagamihara (JP); Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 297 days.

(21) Appl. No.: 11/312,552

(22) Filed: Dec. 21, 2005

(65) Prior Publication Data
US 2007/0106861 A1    May 10, 2007

(30) Foreign Application Priority Data
Nov. 4, 2005    (JP) .............................. 2005-320621

(51) Int. Cl.
G06F 13/10    (2006.01)
(52) U.S. Cl. ....................................... 711/112; 711/203
(58) Field of Classification Search ................. 711/111, 711/112, 114, 147, 203
See application file for complete search history.

(56) References Cited

U.S. PATENT DOCUMENTS

2003/0074528 A1*   4/2003   Soejima et al. ............. 711/114
2003/0131207 A1*   7/2003   Arakawa et al. ............ 711/162
2004/0085907 A1*   5/2004   Daggett ...................... 370/252
2005/0039085 A1    2/2005   Takeda et al.
2005/0086431 A1    4/2005   Kaneda et al.

FOREIGN PATENT DOCUMENTS

JP    2005-062941    8/2003
JP    2005-128604    10/2003

* cited by examiner

Primary Examiner—Reginald G Bragdon
Assistant Examiner—Kenneth M Lo
(74) Attorney, Agent, or Firm—Stites & Harbison PLLC; Juan Carlos A. Marquez, Esq.

(57) ABSTRACT

A management computer includes a configuration information acquisition module that acquires a data volume configuration table indicative of a logical connection relationship between structural elements of the data storage apparatus from the data storage apparatus, a transmission path specification module that specifies the structural elements that exist on a transmission path of data which is required to be written by a host computer from the structural elements of the data storage apparatus on the basis of data volume configuration table that is acquired by the configuration information acquisition module, a performance data acquisition module that acquires the performance data of the structural elements that are specified by the transmission path specification module, and a screen transition control module that output the performance data that is acquired by the performance data acquisition module.

14 Claims, 38 Drawing Sheets

| 1221 | 1222 | 1223 | 1224 | 1225 | 1226 | 1227 | 1228 |
|---|---|---|---|---|---|---|---|
| FC PORT NUMBER | DATA VOLUME NUMBER | HOST COMPUTER NUMBER | REAL / VIRTUAL FLAG | EXTERNAL PORT NUMBER | EXTERNAL DATA STORAGE APPARATUS NUMBER | EXTERNAL DATA STORAGE PORT NUMBER | EXTERNAL DATA VOLUME NUMBER |
| 150A | 132 | 301 | VIRTUAL | 150C | 102 | 150E | 232 |
| 150B | 134 | 302 | VIRTUAL | 150D | 102 | 150F | 234 |
| ... | ... | ... | ... | ... | ... | ... | ... |

DATA VOLUME CONFIGURATION TABLE ⤴ 122

FIG. 5

| DATA VOLUME NUMBER (1241) | RAID GROUP NUMBER (1242) |
|---|---|
| 232 | 200 |
| 234 | 200 |
| 235 | 210 |
| 236 | 210 |
| 237 | 210 |
| 238 | 210 |
| .... | .... |

124

VOLUME AND RAID GROUP MAPPING INFORMATION

FIG. 6

| RAID GROUP NUMBER 1261 | DISK DRIVE NUMBER 1262 |
|---|---|
| 200 | 161 |
| 200 | 162 |
| 200 | 163 |
| 200 | 164 |
| 210 | 165 |
| 210 | 166 |
| 210 | 167 |
| 210 | 168 |
| .... | .... |

126

RAID GROUP AND DISK MAPPING INFORMATION

| FC PORT NUMBER 1212 | DATA TRANSFER SIZE 1213 | BANDWIDTH 1214 | MEASUREMENT PERIOD 1215 |
|---|---|---|---|
| 150A | 20MB/sec | 100MB／sec | 2005/08/01 0:00 ~ 2005/08/01 23:59 |
| 150B | 50MB/sec | 100MB／sec | 2005/08/01 0:00 ~ 2005/08/01 23:59 |
| 150C | 23MB/sec | 100MB／sec | 2005/08/01 0:00 ~ 2005/08/01 23:59 |
| 150D | 55MB/sec | 100MB／sec | 2005/08/01 0:00 ~ 2005/08/01 23:59 |
| …. | …. | …. | …. |
| 150A | 15MB/sec | 100MB／sec | 2005/07/31 0:00 ~ 2005/07/31 23:59 |
| 150B | 12MB/sec | 100MB／sec | 2005/07/31 0:00 ~ 2005/07/31 23:59 |
| 150C | 18MB/sec | 100MB／sec | 2005/07/31 0:00 ~ 2005/07/31 23:59 |
| 150D | 17MB/sec | 100MB／sec | 2005/07/31 0:00 ~ 2005/07/31 23:59 |
| …. | …. | …. | …. |

121

FC PORT PERFORMANCE DATA

| FC PORT NUMBER | DATA TRANSFER SIZE | BANDWIDTH | MEASUREMENT PERIOD |
|---|---|---|---|
| 150E | 23MB/sec | 100MB/sec | 2005/08/01 0:00 ~ 2005/08/01 23:59 |
| 150F | 55MB/sec | 100MB/sec | 2005/08/01 0:00 ~ 2005/08/01 23:59 |
| .... | .... | .... | .... |
| 150E | 29MB/sec | 100MB/sec | 2005/07/31 0:00 ~ 2005/07/31 23:59 |
| 150F | 30MB/sec | 100MB/sec | 2005/07/31 0:00 ~ 2005/07/31 23:59 |
| .... | .... | .... | .... |

FC PORT PERFORMANCE DATA

FIG. 8B

| DATA VOLUME NUMBER | DATA TRANSFER SIZE | BUSY RATE | MEASUREMENT PERIOD |
|---|---|---|---|
| 132 | 20MB/sec | | 2005/08/01 0:00 ~ 2005/08/01 23:59 |
| 134 | 50MB/sec | | 2005/08/01 0:00 ~ 2005/08/01 23:59 |
| .... | .... | .... | .... |
| 132 | 15MB/sec | | 2005/07/31 0:00 ~ 2005/07/31 23:59 |
| 134 | 12MB/sec | | 2005/07/31 0:00 ~ 2005/07/31 23:59 |
| .... | .... | .... | .... |

1232, 1233, 1234, 1235

123

DATA VOLUME PERFORMANCE DATA

FIG. 9A

|  1232  |  1233  |  1234  |  1235  |
| --- | --- | --- | --- |
| DATA VOLUME NUMBER | DATA TRANSFER SIZE | BUSY RATE | MEASUREMENT PERIOD |
| 232 | 23MB/sec | 20% | 2005/08/01 0:00 ~ 2005/08/01 23:59 |
| 234 | 55MB/sec | 55% | 2005/08/01 0:00 ~ 2005/08/01 23:59 |
| .... | .... | .... | .... |
| 232 | 29MB/sec | 30% | 2005/07/31 0:00 ~ 2005/07/31 23:59 |
| 234 | 30MB/sec | 33% | 2005/07/31 0:00 ~ 2005/07/31 23:59 |
| .... | .... | .... | .... |

123

DATA VOLUME PERFORMANCE DATA

*FIG. 9B*

| RAID GROUP NUMBER (1252) | BUSY RATE (1253) | MEASUREMENT PERIOD (1254) |
|---|---|---|
| 200 | 60% | 2005/08/01 0:00 ~ 2005/08/01 23:59 |
| 210 | 20% | 2005/08/01 0:00 ~ 2005/08/01 23:59 |
| .... | .... | .... |
| 200 | 18% | 2005/07/31 0:00 ~ 2005/07/31 23:59 |
| 210 | 19% | 2005/07/31 0:00 ~ 2005/07/31 23:59 |
| .... | .... | .... |

125

RAID GROUP PERFORMANCE DATA

FIG. 10

|  1272 | 1273 | 1274 |
|---|---|---|
| DISK DRIVE NUMBER | BUSY RATE | MEASUREMENT PERIOD |
| 161 | 35% | 2005/08/01 0:00 ~ 2005/08/01 23:59 |
| 162 | 28% | 2005/08/01 0:00 ~ 2005/08/01 23:59 |
| 163 | 32% | 2005/08/01 0:00 ~ 2005/08/01 23:59 |
| 164 | 42% | 2005/08/01 0:00 ~ 2005/08/01 23:59 |
| 165 | 18% | 2005/08/01 0:00 ~ 2005/08/01 23:59 |
| 166 | 25% | 2005/08/01 0:00 ~ 2005/08/01 23:59 |
| 167 | 33% | 2005/08/01 0:00 ~ 2005/08/01 23:59 |
| 168 | 6% | 2005/08/01 0:00 ~ 2005/08/01 23:59 |
| .... | .... | .... |
| 161 | 42% | 2005/07/31 0:00 ~ 2005/07/31 23:59 |
| 162 | 38% | 2005/07/31 0:00 ~ 2005/07/31 23:59 |
| 163 | 52% | 2005/07/31 0:00 ~ 2005/07/31 23:59 |
| 164 | 18% | 2005/07/31 0:00 ~ 2005/07/31 23:59 |
| 165 | 35% | 2005/07/31 0:00 ~ 2005/07/31 23:59 |
| 166 | 28% | 2005/07/31 0:00 ~ 2005/07/31 23:59 |
| 167 | 32% | 2005/07/31 0:00 ~ 2005/07/31 23:59 |
| 168 | 33% | 2005/07/31 0:00 ~ 2005/07/31 23:59 |
| .... | .... | .... |

127

DISK DRIVE PERFORMANCE DATA

FIG. 11

|  5221 | 5222 | 5223 | 5224 |
| --- | --- | --- | --- |
| DEVICE TYPE | DEVICE NAME | DEVICE NUMBER | IP ADDRESS |
| HOST COMPUTER | HOST COMPUTER A | 301 | 192.168.11.31 |
| HOST COMPUTER | HOST COMPUTER B | 302 | 192.168.11.32 |
| DATA STORAGE APPARATUS | DATA STORAGE APPARATUS A | 101 | 192.168.11.51 |
| DATA STORAGE APPARATUS | DATA STORAGE APPARATUS B | 102 | 192.168.11.52 |
| .... | .... | .... | .... |

522

MANAGEMENT DEVICE INFORMATION

FIG. 12

| DATA STORAGE APPARATUS NUMBER | HOST COMPUTER NUMBER | FC PORT PERFORMANCE DATA | | | DATA VOLUME PERFORMANCE DATA | | REAL / VIRTUAL FLAG | MEASUREMENT PERIOD |
|---|---|---|---|---|---|---|---|---|
| | | FC PORT NUMBER | DATA TRANSFER SIZE | BANDWIDTH | DATA VOLUME NUMBER | DATA TRANSFER SIZE | | |
| 101 | 301 | 150A | 20 MB/sec | 100 MB/sec | 132 | 20 MB/sec | VIRTUAL | 2005/8/1 0:00 ~ 2005/8/1 23:59 |
| 101 | 301 | 150B | 50 MB/sec | 100 MB/sec | 134 | 50 MB/sec | VIRTUAL | 2005/8/1 0:00 ~ 2005/8/1 23:59 |

TARGET PORT PERFORMANCE INFORMATION

EXTERNAL PORT PERFORMANCE INFORMATION

| DATA STORAGE APPARATUS NUMBER | EXTERNAL PORT PERFORMANCE INFORMATION | | | DATA VOLUME PERFORMANCE DATA | | EXTERNAL DATA STORAGE APPARATUS NUMBER | EXTERNAL DATA VOLUME NUMBER | MEASUREMENT PERIOD | SELECT FLAG |
|---|---|---|---|---|---|---|---|---|---|
| | FC PORT NUMBER | DATA TRANSFER SIZE | BANDWIDTH | DATA VOLUME NUMBER | DATA TRANSFER SIZE | | | | |
| 101 | 150C | 20MB /sec | 100MB /sec | 132 | 20MB /sec | 102 | 232 | 2005/8/1 0:00 ~ 2005/8/1 23:59 | * |
| 101 | 150D | 50MB /sec | 100MB /sec | 134 | 50MB /sec | 102 | 234 | 2005/8/1 0:00 ~ 2005/8/1 23:59 | |

6210, 6220, 6221, 6223, 6225, 6230, 6231, 6233, 6240, 6250, 6260, 6270, 620

| DATA STORAGE APPARATUS NUMBER | HOST COMPUTER NUMBER | FC PORT PERFORMANCE DATA ||| DATA VOLUME PERFORMANCE DATA || MEASUREMENT PERIOD | SELECT FLAG |
| --- | --- | --- | --- | --- | --- | --- | --- | --- |
| | | FC PORT NUMBER | DATA TRANSFER SIZE | BANDWIDTH | DATA VOLUME NUMBER | DATA TRANSFER SIZE | | |
| 102 | 301 | 150E | 23 MB/sec | 100 MB/sec | 232 | 23 MB/sec | 2005/8/1 0:00 ~ 2005/8/1 23:59 | * |
| 102 | 301 | 150F | 55 MB/sec | 100 MB/sec | 234 | 55 MB/sec | 2005/8/1 0:00 ~ 2005/8/1 23:59 | |

EXTERNAL DATA STORAGE PORT PERFORMANCE INFORMATION

FIG. 21

| DATA STORAGE APPARATUS NUMBER | RAID GROUP PERFORMANCE DATA | | DATA VOLUME PERFORMANCE DATA | | MEASUREMENT PERIOD | SELECT FLAG |
|---|---|---|---|---|---|---|
| | RAID GROUP NUMBER | BUSY RATE | DATA VOLUME NUMBER | BUSY RATE | | |
| 102 | 200 | 60% | 232 | 20% | 2005/8/1 0:00 ~ 2005/8/1 23:59 | * |
| 102 | 200 | 60% | 234 | 55% | 2005/8/1 0:00 ~ 2005/8/1 23:59 | |
| 102 | 210 | 20% | 235 | 18% | 2005/8/1 0:00 ~ 2005/8/1 23:59 | |
| 102 | 210 | 20% | 236 | 15% | 2005/8/1 0:00 ~ 2005/8/1 23:59 | |
| 102 | 210 | 20% | 237 | 33% | 2005/8/1 0:00 ~ 2005/8/1 23:59 | |
| 102 | 210 | 20% | 238 | 8% | 2005/8/1 0:00 ~ 2005/8/1 23:59 | |

RAID GROUP PERFORMANCE INFORMATION

FIG. 24

| DATA STORAGE APPARATUS NUMBER | RAID GROUP PERFORMANCE DATA | | DISK DRIVE PERFORMANCE DATA | | MEASUREMENT PERIOD | SELECT FLAG |
|---|---|---|---|---|---|---|
| | RAID GROUP NUMBER | BUSY RATE | DISK DRIVE NUMBER | BUSY RATE | | |
| 102 | 200 | 60% | 161 | 35% | 2005/8/1 0:00 ~ 2005/8/1 23:59 | * |
| 102 | 200 | 60% | 162 | 28% | 2005/8/1 0:00 ~ 2005/8/1 23:59 | * |
| 102 | 200 | 60% | 163 | 32% | 2005/8/1 0:00 ~ 2005/8/1 23:59 | * |
| 102 | 200 | 60% | 164 | 42% | 2005/8/1 0:00 ~ 2005/8/1 23:59 | * |
| 102 | 210 | 20% | 165 | 18% | 2005/8/1 0:00 ~ 2005/8/1 23:59 | |
| 102 | 210 | 20% | 166 | 25% | 2005/8/1 0:00 ~ 2005/8/1 23:59 | |
| 102 | 210 | 20% | 167 | 33% | 2005/8/1 0:00 ~ 2005/8/1 23:59 | |
| 102 | 210 | 20% | 168 | 6% | 2005/8/1 0:00 ~ 2005/8/1 23:59 | |

DISK PERFORMANCE INFORMATION

FIG. 27

| FC PORT NUMBER | DATA VOLUME NUMBER | HOST COMPUTER NUMBER | REPLICATION DATA VOLUME NUMBER |
|---|---|---|---|
| 150P | 141 | 302 | 142 |
| 150Q | 144 | 303 | 143 |

*FIG. 34*

PERFORMANCE REPORTING METHOD CONSIDERING STORAGE CONFIGURATION

CLAIM OF PRIORITY

The present application claims priority from Japanese patent application P2005-320621 filed on Nov. 4, 2005, the content of which is hereby incorporated by reference into this application.

BACKGROUND

This invention relates to a computer system including a host computer and a data storage apparatus, and more particularly to a technique that manages the performance of the data storage apparatus.

A large-scale data storage apparatus typified by a disk array device has plural data volumes. The data storage apparatus provides the data volumes to plural host computers. A program that is executed by the host computers and data required in execution of the program are stored in the data volumes of the data storage apparatus.

The data storage apparatus which plural host computers access is demanded high performance. Under the circumstances, an administrator needs to analyze a performance indicator of the structural element of the data storage apparatus when establishing or managing a computer system including plural host computers.

For example, it is assumed that IOs from the plural host computers are concentrated on a specific disk drive group or a specific port. In this case, the data storage apparatus allows an access performance to be deteriorated by the competition of IOs. Therefore, the administrator needs to specify a host computer that exerts a load on the data storage apparatus.

A technique by which the host computer that exerts the load on the data storage apparatus is specified is disclosed in JP 2005-62941A. According to the technique, the host computer that exerts the load on the disk drive group of the data storage apparatus or the port of the data storage apparatus is specified on the basis of mapping information of the data volumes and the host computers.

SUMMARY

In the above-mentioned conventional art, since the host computer using the disk drive group or port which is high in the load can be specified, the competition of IOs can be detected.

However, according to the conventional art, it is difficult to detect the IO competition since a data path straddles plural data storage apparatuses in a computer system using a virtualization function of the data volume or a remote copy function between the plural data storage apparatuses.

The administrator must grasp the data path of the computer system in order to specify a structural element where IOs compete against each other. Moreover, the administrator must acquire the performance data of the structural element on the grasped data path by a performance monitor tool. In addition, the administrator needs to correctly analyze those data pieces with the association. In this way, a specific operation of the structural element in which IOs compete with each other largely comes to the administrator's share.

This invention has been made in view of the above-mentioned problem, and therefore an object of this invention is to provide a management computer that outputs the performance data of the structural element of the data storage apparatus while taking a data path into consideration.

According to a typical embodiment of this invention, there is provided a computer system including: at least one first data storage apparatus; at least one second data storage apparatus; at least one host computer that is connected to the first data storage apparatus via a network; and a management computer that can access the first data storage apparatus, the second data storage apparatus, and the host computer. The first data storage apparatus includes: a first interface that has at least one logic port and is connected to the network; a first processor that is connected to the first interface; a first memory that is connected to the first processor; and a first disk drive that stores data that is required to be written by the host computer. The first data storage apparatus supplies to the host computer a first data volume in which the data is required to be written by the host computer. The second data storage apparatus includes: a second interface that has at least one logic port is connected to the network; a second processor that is connected to the second interface; and a second disk drive that stores the data which is required to be written by the host computer. The management computer includes: a third interface that is connected to the external; a third processor that is connected to the third interface; and a third memory that is connected to the third processor. The second data storage apparatus constitutes a RAID group by the plural second disk drives, and provides the RAID group as at least one second data volume. The second data volume can store data which is required to be written in the first data volume of the first data storage apparatus. The first memory stores a first data volume configuration table which indicates a logical connection relationship of the structural elements of the first data storage apparatus therein, and the second memory stores a second data volume configuration table which indicates a logical connection relationship of the structural elements of the second data storage apparatus. The third processor acquires at least one of the first data volume configuration table that is stored in the first memory and the second data volume configuration table that is stored in the second memory. The third processor specifies at least one of the ports, the first data volume, the second data volume, the first disk drive, the second disk drive, and the RAID group which exist on a transmission path of the data required to be written by the host computer, from the structural elements of the first data storage apparatus and the second data storage apparatus on the basis of at least one of the acquired first data volume configuration table and the acquired second data volume configuration table. Then, the third processor acquires the performance data of the specified structural element, and outputs the acquired performance data.

According to the typical embodiment of this invention, the performance of the structural element of the data storage apparatus can be outputted while considering the data path.

BRIEF DESCRIPTION OF THE DRAWINGS

The present invention can be appreciated by the description which follows in conjunction with the following figures, wherein:

FIG. 5 is a structural diagram showing a data volume configuration table of the data storage apparatus according to the first embodiment;

FIG. 6 is a structural diagram showing volume and RAID group mapping information of the data storage apparatus according to the first embodiment;

FIG. 8B is a structural diagram showing the FC port performance data of a data storage apparatus B according to this invention;

FIG. 9A is a structural diagram showing the data volume performance data of the data storage apparatus A according to the first embodiment;

FIG. 9B is a structural diagram showing the data volume performance data of the data storage apparatus B according to the first embodiment;

FIG. 10 is a structural diagram showing the RAID group performance data of the data storage apparatus according to the first embodiment;

FIG. 11 is a structural diagram showing the disk drive performance data of the data storage apparatus according to the first embodiment;

FIG. 12 is a structural diagram showing the management device information of a management computer according to the first embodiment;

FIG. 14 is a structural diagram showing the target port performance information of the management computer according to the first embodiment;

FIG. 18 is a structural diagram showing the external port performance data of the management computer according to the first embodiment;

FIG. 21 is a structural diagram showing an external diagram showing an external data storage port performance information according to the first embodiment;

FIG. 24 is a structural diagram showing the RAID group performance information of the management computer according to the first embodiment;

FIG. 27 is a structural diagram showing the disk performance information of the management computer according to the first embodiment;

FIG. 34 is a structural diagram showing a replication data volume configuration table according to a fourth embodiment;

DESCRIPTION OF THE PREFERRED EMBODIMENTS

Now, a description will be given of embodiments of this invention with reference to the accompanying drawings.

First Embodiment

Figure 1:
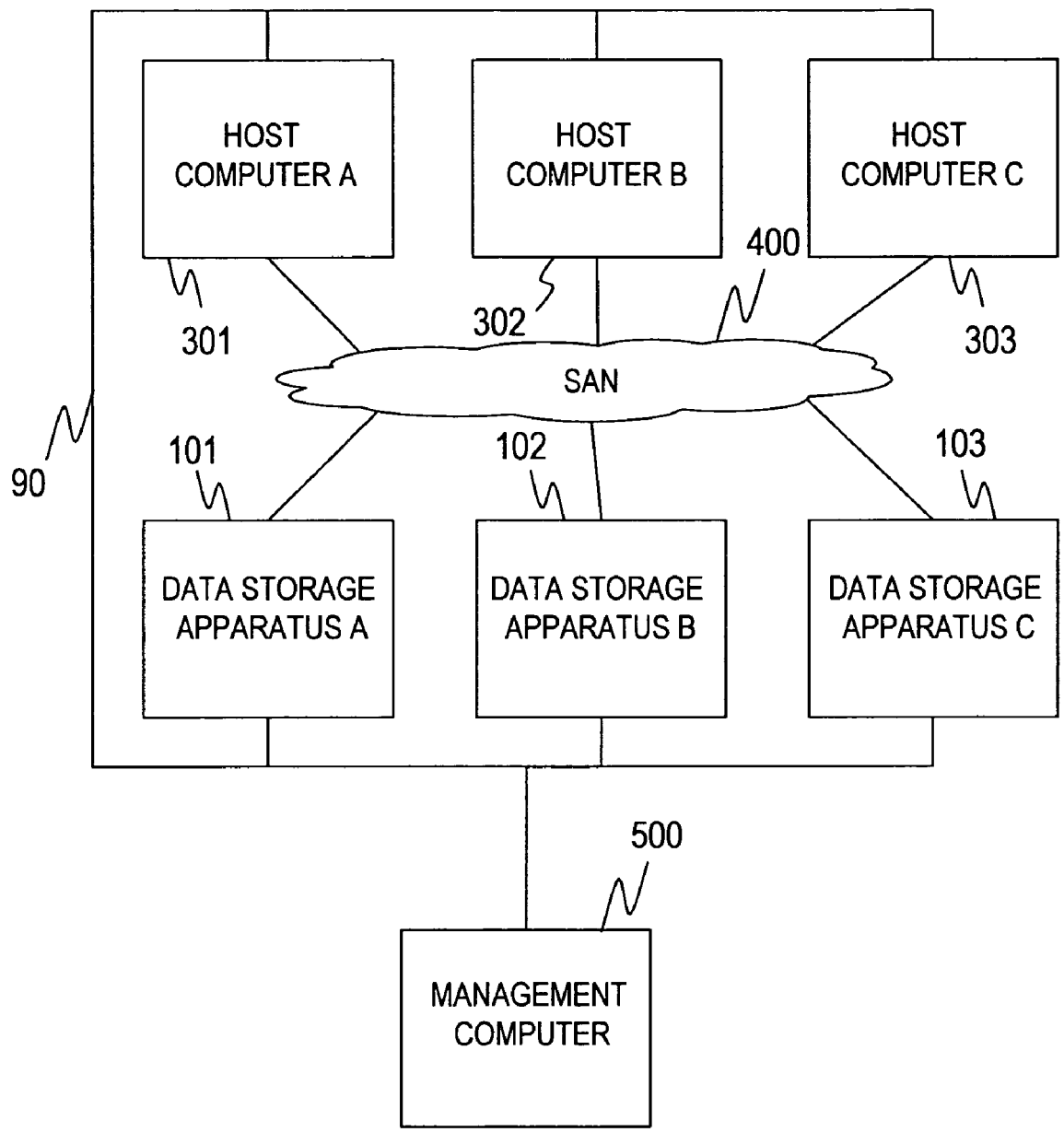
FIG. 1 is a block diagram showing a computer system according to a first embodiment.

FIG. 1 is a block diagram showing a computer system according to a first embodiment.

The computer system includes a host computer A 301, a host computer B 302, a host computer C 303, a data storage apparatus A 101, a data storage apparatus B 102, a data storage apparatus C 103, a management computer 500, a SAN 400, and a management network 90.

The host computer 301 to 303 and the data storage apparatus 101 to 103 are connected to each other through the SAN 400. The SAN 400 is, for example, a conventional network such as a fibre channel or the Ethernet, and includes one or more connection devices.

The host computer 301 to 303 includes a CPU, a memory, and an interface, and writes data in the data storage apparatus 101 to 103. The host computer 301 to 303 recognizes the disk drive of the data storage apparatus 101 to 103 as the logic data volume. Three host computers 301 to 303 are shown in the figure, but the number of host computer is not limited.

The data storage apparatus 101 to 103 will be described later with reference to FIG. 2. The data storage apparatus 101 to 103 stores data which is required to be written from the host computer 301 to 303. Three data storage apparatuses 101 to 103 are shown in the figure, but the number of data storage apparatuses 101 to 103 is not limited.

The host computer 301 to 303 and the data storage apparatus 101 to 103 are connected to the management computer 500 on the management network 90.

The management network 90 is, for example, a conventional network such as the Ethernet. The SAN 400 and the management network 90 may be realized by one network.

The management computer 500 will be described with reference to FIG. 3 later. The management computer 500 is a host computer that manages the entire computer system.

Figure 2:
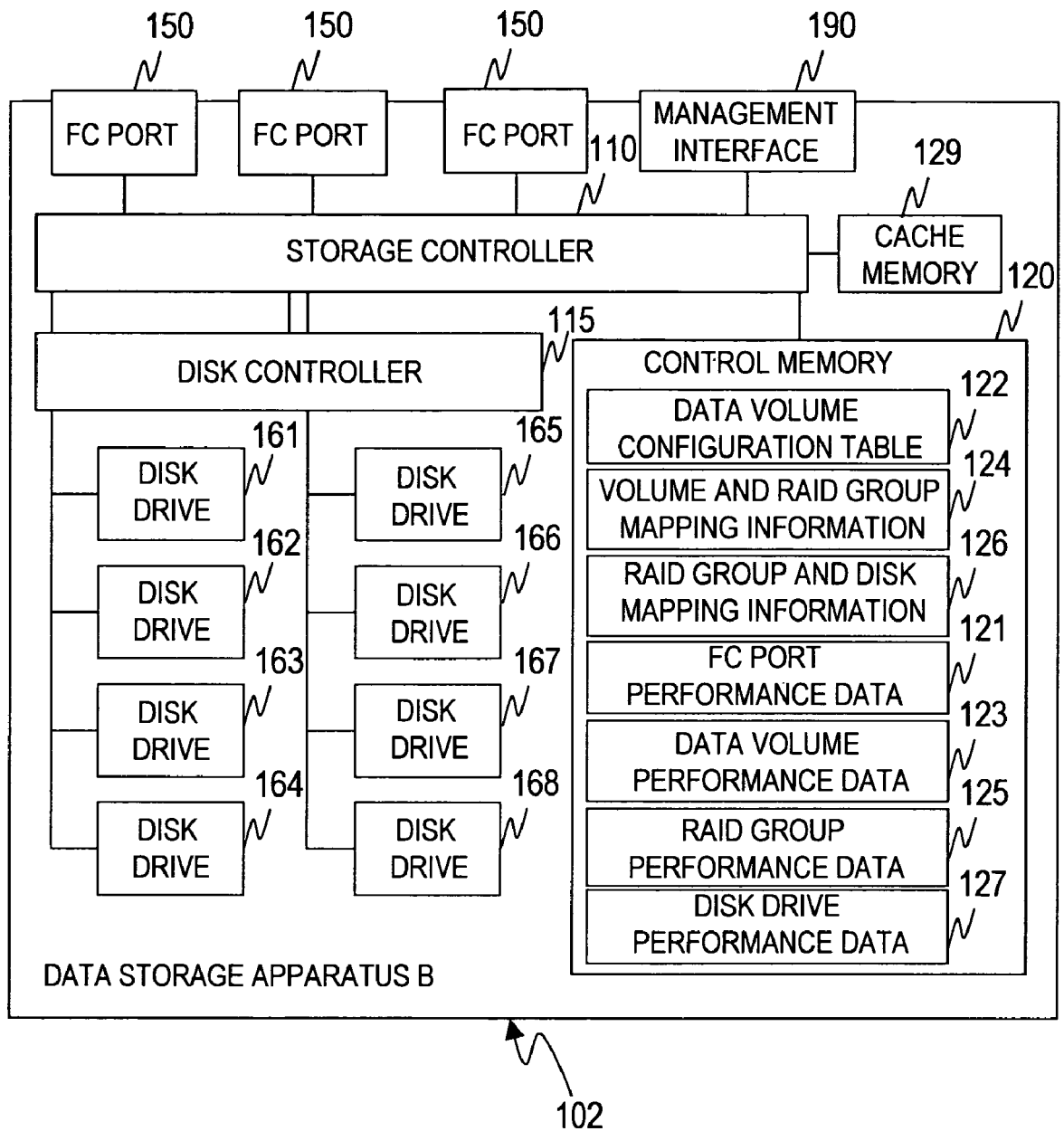
FIG. 2 is a block diagram showing a data storage apparatus according to the first embodiment.

FIG. 2 is a block diagram showing the data storage apparatus B 102 according to the first embodiment.

The data storage apparatus B 102 includes FC ports 150, a management interface 190, a storage controller 110, a cache memory 129, disk drives 161 to 168, a disk controller 115, and a control memory 120.

Each of the FC ports 150 is connected to the host computer 301 to 303 or another data storage apparatus 101 to 103 through the SAN 400. The management interface 190 is connected to the management computer 500 through the management network.

The storage controller 110 executes a program which is stored in the control memory 120 to control the entire data storage apparatus 101 to 103. The cache memory 129 temporarily stores data therein. The disk drive 161 to 168 stores therein data which is required to be written from the host computer 301 to 303.

The disk controller 115 executes a program that is stored in the control memory 120 to control the disk drive 161 to 168. The disk controller 115 has the disk drive 161 to 168, structured by a RAID (redundant array of independent disks) having a redundancy. The disk controller 115 deals with the assembly of the disk drive 161 to 168, as a virtual disk (RAID group).

In addition, the disk controller 115 divides the RAID group into one or more logical data volumes and supplies those logical data volumes to the host computer 301 to 303. With this structure, the host computer 301 to 303 recognizes the disk drive 161 to 168 of the data storage apparatus 101 to 103 as a logical data volume.

The control memory 120 stores therein a program that is executed by the storage controller 110 and the disk controller 115. Also, the control memory 120 stores therein information required by the storage controller 110 and the disk controller 115.

More specifically, the control memory 120 stores therein a data volume configuration table 122, volume and RAID group mapping information 124, RAID group and disk drive mapping information 126, FC port performance data 121, data volume performance data 123, RAID group performance data 125, and disk drive performance data 127.

The data volume configuration table 122 is information pertaining to the configuration of the data volume of the data storage apparatus 101 to 103. Also, the data volume configuration table 122 includes information related to a logical connection relationship of the structural elements of the data storage apparatus 101 to 103.

The volume and RAID group mapping information 124 will be described with reference to FIG. 6 later. The volume and RAID group mapping information 124 manages a correspondence of the logical data volume and the RAID group. The RAID group and disk drive mapping information 126 will be described with reference to FIG. 7 later. The RAID group and disk drive mapping information 126 manages a correspondence of the RAID group and the disk drive 161 to 168.

The FC port performance data 121 will be described with reference to FIGS. 8A and 8B later. The FC port performance data 121 manages a history related to the performance data of the FC port 150. The data volume performance data 123 will be described with reference to FIGS. 9A and 9B later. The data volume performance data 123 manages a history related to the performance data of the logical data volume.

The RAID group performance data 125 will be described with reference to FIG. 10 later. The RAID group performance data 125 manages a history related to the performance data of the RAID group. The disk drive performance data 127 will be described with reference to FIG. 11 later. The disk drive performance data 127 manages a history related to the performance data of the disk drive 161 to 168.

The configurations of the data storage apparatus A 101 and the data storage apparatus C 103 are identical with the configuration of the data storage apparatus B 102, and therefore their description will be omitted.

Figure 3:
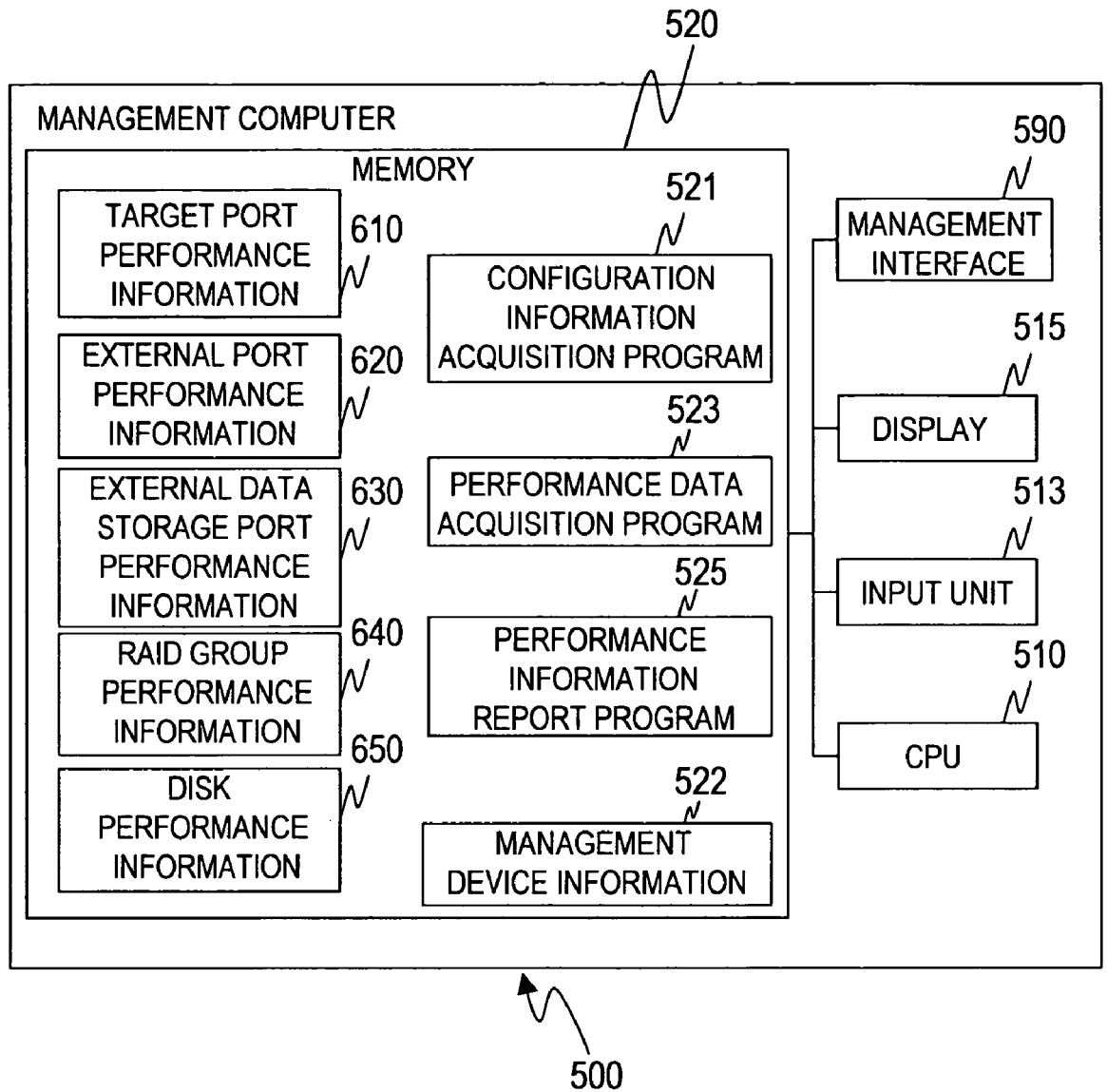
FIG. 3 is a block diagram showing a management computer according to the first embodiment.

FIG. 3 is a block diagram showing the management computer 500 according to the first embodiment.

The management computer 500 includes a CPU 510, a memory 520, a management interface 590, a display 515, and an input unit 513.

The CPU 510 executes a program that is stored in the memory 520 to execute various processing.

The management interface 590 is connected to the host computer 301 to 303 and the data storage apparatus 101 to 103 via the management network 90.

The display 515 displays various information thereon to give to an administrator. The administrator inputs the information to the input unit 513. The input unit 513 transmits the inputted information to the CPU 510. The input unit 513 is, for example, a mouse or keyboard.

The memory 520 stores therein a program that is executed by the CPU 510 and information that is required by the CPU 510.

More specifically, the memory 520 stores therein management device information 522, configuration information acquisition program 521, performance data acquisition program 523, performance information report program 525, target port performance information 610, external port performance information 620, external data storage port performance information 630, RAID group performance information 640, and disk performance information 650.

The management device information 522 will be described with reference to FIG. 12 later. The management device information 522 is information related to devices (the host computer 301 to 303, and the data storage apparatus 101 to 103.) which are managed by the management computer 500.

The target port performance information 610 includes information related to the performance of the target port. In addition, the target port performance information 610 includes information related to the performance of the data volume which is accessed through the target port. The target port is the FC port 150 through which a path allocated between the host computer 301 to 303 and the data storage apparatus 101 to 103 passes.

The external port performance information 620 includes information related to the performance of the external port. In addition, the external port performance information 620 includes information related to the data volume which is accessed through the external port. The external port is the FC port 150 of the data storage apparatus 101 to 103, which are connected to the host computer 301 to 303. A path that is allocated between the data storage apparatuses 101 to 103 and the host computer 301 to 303 passes through the external port.

The external data storage performance information 630 includes information related to the performance of the external data storage port. In addition, the external data storage port performance information 630 includes information related to the performance of the port of the external data storage apparatus. The external data storage port is the FC port 150 of the data storage apparatus 101 to 103 that is connected to the data storage apparatus 101 to 103 that stores therein the external data storage port performance information 630. A path that is allocated between those data storage apparatuses 101 to 103 passes through the external data storage port.

The RAID group performance information 640 includes information related to the performance of the logical data volume of the data storage apparatus 101 to 103 and information related to the performance of the RAID group to which the logical data volume belongs.

The disk performance information 650 includes information related to the performance of the RAID group of the data storage apparatus 101 to 103 and information related to the performance of the disk drive that configures the RAID group.

The configuration information acquisition program 521 acquires information related to the configuration of the data storage apparatus 101 to 103. More specifically, the configuration information acquisition program 521 acquires the data volume configuration table 122, the volume and RAID group mapping information 124, and the RAID group and disk mapping information 126 from the data storage apparatus 101 to 103.

The performance data acquisition program 523 acquires information related to the performance of the data storage apparatus 101 to 103. More specifically, the performance data acquisition program 523 acquires the FC port performance data 121, the data volume performance data 123, the RAID group performance data 125, and the disk drive performance data 127 from the data storage apparatus 101 to 103.

The performance information report program 525 produces an analysis screen on the basis of the information which is acquired by the configuration information acquisition program 521 and the performance data acquisition program 523. Then, the performance information report program 525 displays the produced analysis screen on the display 515.

More specifically, upon receiving an instruction of screen transition from the administrator, the performance information report program 525 requires necessary information of the configuration information acquisition program 521 and the performance data acquisition program 523.

Then, the configuration information acquisition program 521 and the performance data acquisition program 523 acquire the information required from the performance information report program 525.

Subsequently, the performance information report program 525 produces the target port performance information 610, the external port performance information 620, the external data storage port performance information 630, the RAID group performance information 640, or the disk performance information 650 on the basis of the information that is acquired by the configuration information acquisition program 521 and the performance data acquisition program 523.

A process of producing the target port performance information 610 will be described in more detail with reference to FIG. 15. Also, a process of producing the external port performance information 620 will be described in more detail with reference to FIG. 19. Further, a process of producing the external data storage port performance information 630 will be described in more detail with reference to FIG. 22. Further, a process of producing the RAID group performance information 640 will be described in more detail with reference to FIG. 25. Also, a process of producing the disk performance information 650 will be described in more detail with reference to FIG. 28.

The performance information report program 525 produces an analysis screen on the basis of updated information. The analysis screen will be described with reference to FIGS. 16, 20, 23, 26, and 29 later. Then, the performance information report program 525 allows the produced analysis screen to be displayed on the display 515.

Figure 4:
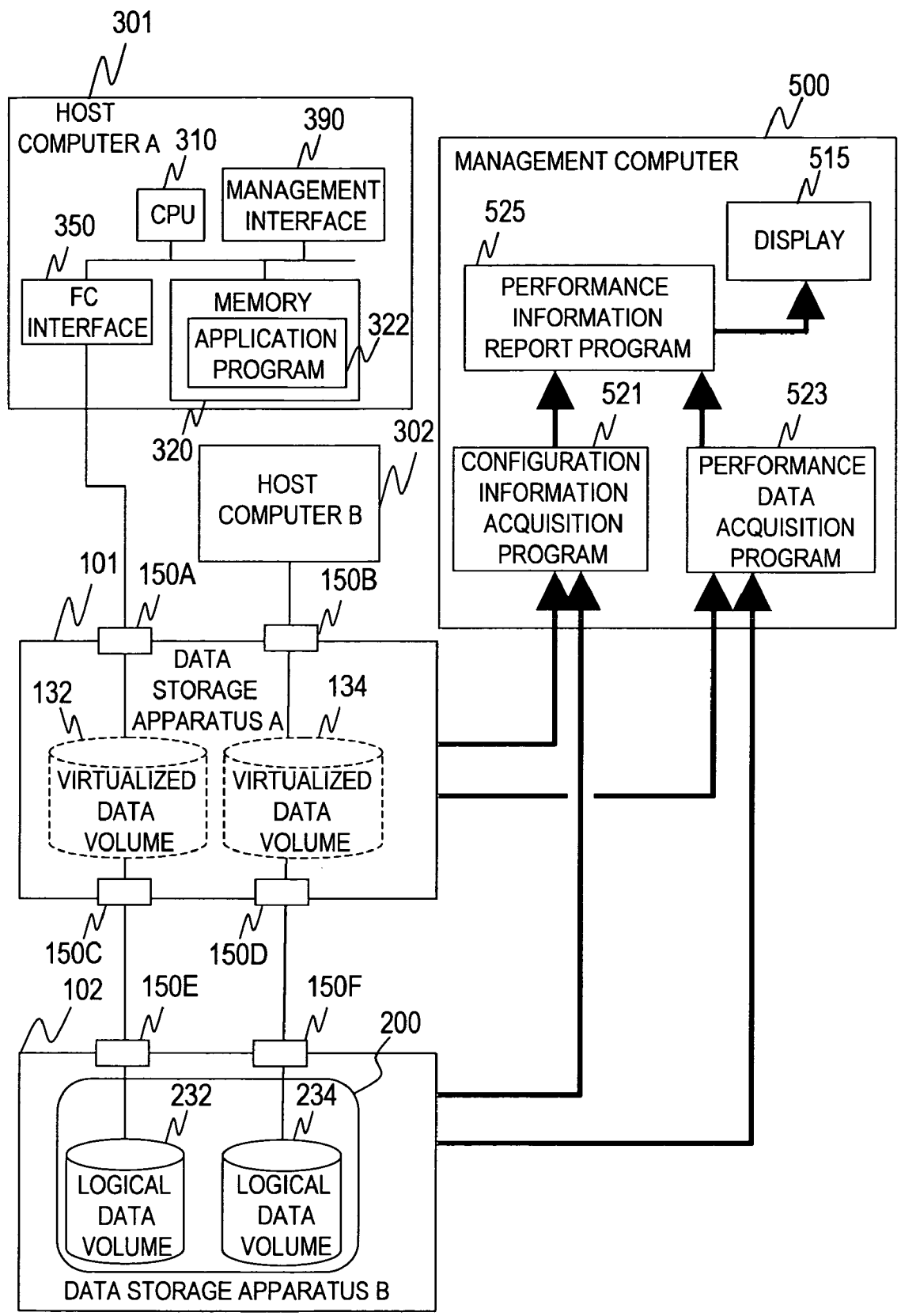
FIG. 4 is an explanatory diagram showing a path of a computer system according to the first embodiment.

FIG. 4 is an explanatory diagram showing a path of the computer system according to the first embodiment.

In FIG. 4, the physical path of the computer system is omitted, and only a path indicative of the logical connection of the computer system is shown.

The host computer A 301 includes a CPU 310, a memory 320, an FC interface 350, and a management interface 390.

The CPU 310 executes a program that is stored in the memory 320 to conduct various processing.

The memory 320 stores program that is executed by the CPU and information required by the CPU therein. More specifically, the memory 320 stores an application program 322 therein.

The application program 322 transmits a read request or a write request to the data storage apparatus 101 to 103.

The FC interface 350 is connected to the data storage apparatus 101 to 103 through the SAN 400. Also, the management interface 390 is connected to the management computer 500 on the management network 90.

Since the configuration of the host computer B 302 is identical with that of the host computer A 301, the configuration of the host computer B 302 will be omitted from drawings and description.

The data storage apparatus A 101 includes FC ports 150A, 150B, 150C, and 150D, and virtualized data volumes 132 and 134. Also, the data storage apparatus B 102 includes FC ports 150E and 150F, and logical data volumes 232 and 234.

The data storage apparatus A 101 may include not only the virtualized data volumes 132 and 134 but also logical data volumes.

The virtualized data volume 132 of the data storage apparatus A 101 cannot actually store data therein. Therefore, the data storage apparatus A 101 supplies the logical data volume 232 of the data storage apparatus B 102 to the host computer A 301 as its virtualized data volume 132.

Likewise, the virtualized data volume 134 of the data storage apparatus A 101 cannot actually store data therein. Therefore, the data storage apparatus A 101 supplies the logical data volume 234 of the data storage apparatus B 102 to the host computer B 302 as its virtualized data volume 134.

The logical data volume 232 and the logical data volume 234 of the data storage apparatus B 102 belong to one RAID group 200.

In this embodiment, the virtualized data volume 132 of the data storage apparatus A 101 is assigned to the host computer A 301. For that reason, a path that is routed through the FC port 150A of the data storage apparatus A 101 is allocated between the host computer A 301 and the virtualized data volume 132 of the data storage apparatus A 101. That is, data that is required to be written in the virtualized data volume 132 of the data storage apparatus A 101 by the host computer A 301 is transmitted to the virtualized data volume 132 of the data storage apparatus A 101 from the host computer A 301 with the path as a transmission path.

Also, a path that is routed through the FC port 150C of the data storage apparatus A 101 and the FC port 150E of the data storage apparatus B102 is allocated between the virtualized data volume 132 of the data storage apparatus A 101 and the logical data volume 232 of the data storage apparatus B 102. That is, data that is required to be written in the virtualized data volume 132 of the data storage apparatus A 101 by the host computer A 301 is transmitted to the logical data volume 232 of the data storage apparatus B 102 from the virtualized data volume 132 of the data storage apparatus A 101 with the path as a transmission path.

With the above configuration, the host computer A 301 recognizes the logical data volume 232 of the data storage apparatus B 102 as the data volume of the data storage apparatus A 101.

Upon receiving the write request to the virtualized data volume 132, the data storage apparatus A 101 transfers the write request to the data storage apparatus B 102.

Also, the virtualized data volume 134 of the data storage apparatus A 101 is assigned to the host computer B 302. For that reason, a path that is routed through the FC port 150B of the data storage apparatus A 101 is allocated between the host computer B 302 and the virtualized data volume 134 of the data storage apparatus A 101. That is, data that is required to be written in the virtualized data volume 134 of the data storage apparatus A 101 by the host computer A 302 is transmitted to the virtualized data volume 134 of the data storage apparatus A 101 from the host computer B 302 with the path as a transmission path.

Also, a path that is routed through the FC port 150D of the data storage apparatus A 101 and the FC port 150F of the data storage apparatus B 102 is allocated between the virtualized data volume 134 of the data storage apparatus A 101 and the logical data volume 234 of the data storage apparatus B 102. That is, data that is required to be written in the virtualized data volume 134 of the data storage apparatus A 101 by the host computer A 302 is transmitted to the logical data volume 234 of the data storage apparatus B 102 from the virtualized data volume 134 of the data storage apparatus A 101 with the path as a transmission path.

With the above configuration, the host computer B302 recognizes the logical data volume 234 of the data storage apparatus B 102 as the data volume of the data storage apparatus A 101.

Upon receiving the write request to the virtualized data volume 134, the data storage apparatus A 101 transfers the write request to the data storage apparatus B 102.

The data storage apparatus B 102 may supply its logical data volume directly to the host computer 301 to 303.

An outline of the processing of the management computer 500 will be described with reference to the drawings.

The configuration information acquisition program 521 of the management computer 500 acquires information related to the configurations of the data storage apparatus A 101 and the data storage apparatus B 102. Also, the performance data acquisition program 523 of the management computer 500 acquires information related to the performances of the data storage apparatus A 101 and the data storage apparatus B 102.

Subsequently, the performance information report program 525 of the management computer 500 produces an analysis screen on the basis of the information acquired by the configuration information acquisition program 521 and the performance data acquisition program 523. Then, the performance information report program 525 allows the produced analysis screen to be displayed on the display 515.

FIG. 5 is a structural diagram showing the data volume configuration table 122 of the data storage apparatus A 101 according to the first embodiment.

The data volume configuration table 122 includes FC port numbers 1221, data volume numbers 1222, host computer numbers 1223, real/virtual flags 1224, external port numbers 1225, external data storage apparatus numbers 1226, external data storage port numbers 1227, and external data storage area numbers 1228.

The FC port numbers 1221 are unique identifiers of the FC ports 150 of the data storage apparatus A 101. The data volume numbers 1222 are unique identifiers of the data volumes of the data storage apparatus A 101, which are unique identifiers of the data volumes that are accessed through the FC ports 150 identified by the FC port numbers 1221. The data volume may be any one of the logical data volume and the virtualized data volume.

The host computer numbers 1223 are unique identifiers of the host computer 301 to 303 that accesses the data volumes. For example, WWNs (world wide names) are stored in the host computer number 1223.

The real/virtual flags 1224 indicate whether or not the data volumes of the record can actually store data therein. For example, in the case where the data volume is the logical data volume in which data can be actually stored, "real" is stored in the real/virtual flag 1224. On the other hand, in the case where the data volume is the virtualized data volume that cannot actually store data, "virtual" is stored in the real/virtual flag 1224.

The external port numbers 1225 are unique identifiers of the FC ports 150 of the data storage apparatus A 101, which are unique identifiers of the FC ports 150 through which the path that is allocated between the data volume of the data storage apparatus A 101 and the external data storage apparatus B 102 is routed.

The external data storage apparatus numbers 1226 are unique identifiers of the external data storage apparatus B 102 between which and the data volume of the data storage apparatus A 101 a path is allocated. The external data storage port numbers 1227 are unique identifiers of the FC ports 150 of the external data storage apparatus B 102, which are unique identifiers of the FC ports 150 through which a path that is allocated between the data storage apparatus A 101 and the externally connected data storage apparatus B 102 is routed.

The external data storage area numbers 1228 are unique identifiers of the data volumes that are accessed through the FC ports 150 of the external data storage apparatus B 102. In the case where "virtual" is stored in the real/virtual flag 1224, the external data storage area numbers 1228 are unique identifiers of the logical data volumes in which data that is required to be written into the virtualized data volume of the data storage apparatus A 101, is stored. Also, in the case where "real" is stored in the real/virtual flags 1224, the external data storage area numbers 1228 are unique identifiers of the logical data volumes in which the replication data of the logical data volume of the data storage apparatus A 101, is stored.

In the case where the data volumes of the data storage apparatus A 101 are logical data volumes in which data can be actually stored, and are not replicated by a copying function, no value is stored in the external port numbers 1225, the external data storage apparatus numbers 1226, the external data storage port numbers 1227, and the external data storage area numbers 1228.

Also, in this embodiment, numbers attached in FIG. 4 are used as identifiers, but other identifiers may be used.

The data storage apparatus B 102 and the data storage apparatus C 103 also have the same data volume configuration table 122 as that of the data storage apparatus A 101.

FIG. 6 is a structural diagram showing volume and RAID group mapping information 124 of the data storage apparatus B 102 according to the first embodiment.

The volume and RAID group mapping information 124 includes the data volume numbers 1241 and the RAID group numbers 1242.

The data volume numbers 1241 are unique identifiers of the logical data volumes 232, etc. of the data storage apparatus B 102. Therefore, no information related to the virtualized data volume is stored in the volume and RAID group mapping information 124.

The RAID group numbers 1242 are unique identifiers of the RAID groups to which the logical data volumes 242 belong.

According to the structural diagram, the logical data volumes 232 and 234 belong to the RAID group 200. Also, the logical data volumes 235, 236, 237, and 238 belong to the RAID group 210.

The data storage apparatus A 101 and the data storage apparatus C 103 include the same volume and RAID group mapping information 124 as that of the data storage apparatus B 102.

Figure 7:
FIG. 7 is a structural diagram showing a RAID group and disk mapping information of the data storage apparatus according to the first embodiment.

FIG. 7 is a structural diagram showing RAID group and disk mapping information 126 of the data storage apparatus B 102 according to the first embodiment.

The RAID group and disk mapping information 126 includes the RAID group numbers 1261 and disk drive numbers 1262.

The RAID group numbers 1261 are unique identifiers of the RAID group 200, etc. of the data storage apparatus B 102. The disk drive numbers 1262 are unique identifiers of the disk drive 161, etc. that configures the RAID group 200, etc.

According to the structural diagram, the RAID group 200 is made up of four disk drives 161, 162, 163, and 164. Also, the RAID group 210 is made up of four disk drives 165, 166, 167, and 168.

The data storage apparatus A 101 and the data storage apparatus C 103 also include the same RAID group and disk mapping information 126 as that of the data storage apparatus B 102.

Figure 8A:
FIG. 8A is a structural diagram showing the FC port performance data of a data storage apparatus A according to this invention.

FIG. 8A is a structural diagram showing the FC port performance data 121 of the data storage apparatus A 101 according to the first embodiment. FIG. 8B is a structural diagram showing the FC port performance data 121 of the data storage apparatus A 102 according to the first embodiment.

The FC port performance data 121 includes FC port numbers 1212, data transfer sizes 1213, bandwidths 1214, and measurement periods 1215.

The FC port numbers 1212 are unique identifiers of the FC ports 150 of the data storage apparatus 101 to 103. The data transfer sizes 1213 are data transfer sizes (MB/sec) of the FC ports 150 per unit time. The bandwidths 1214 are data transfer sizes (MB/sec) per unit time, which can be physically transferred by the FC ports 150.

The measurement periods 1215 are periods during which the data transfer sizes 1213 of the record have been measured.

The FC port performance data 121 manages a history of information related to the performance of the respective FC ports 150. The FC port performance data 121 may include not the data transfer sizes 1213 but other information related to the performance of the FC ports 150. For example, the FC port performance data 121 may include the number of times of input/output accesses in one second or a response time.

Subsequently, a description will be given of an update process of the FC port performance data 121 of the data storage apparatus 101 to 103.

The data storage apparatus 101 to 103 periodically measures the data transfer sizes of the respective FC ports 150.

Subsequently, the data storage apparatus 101 to 103 produces a new record in the FC port performance data 121. Then, the data storage apparatus 101 to 103 stores the identifier of the FC port that has measured the data transfer size in the FC port number 1212 of the new record. Then, the data storage apparatus 101 to 103 stores the measured data transfer size in the data transfer size 1213 of the new record. Thereafter, the data storage apparatus 101 to 103 stores the bandwidth of the FC port that has measured the data transfer size in the bandwidth 1214 of the new record. Then, the data storage apparatus 101 to 103 stores a period of time during which the data transfer size has been measured in the measurement period 1215 of the new record.

As described above, the data storage apparatus 101 to 103 updates the FC port performance data 121.

FIG. 9A is a structural diagram showing the data volume performance data 123 of the data storage apparatus A 101 according to the first embodiment. FIG. 9B is a structural diagram showing the data volume performance data 123 of the data storage apparatus B 102 according to the first embodiment.

The data volume performance data 123 includes data volume numbers 1232, data transfer sizes 1233, busy rates 1234, and measurement periods 1235.

The data volume numbers 1232 are unique identifiers of the data volumes of the data storage apparatus 101 to 103. The data volume may be any one of the logical data volume and the virtualized data volume.

The data transfer sizes 1233 are data transfer sizes (MB/sec) to the data volume per unit time.

The busy rate 1234 is a rate of the time of a busy state, which is in the data volumes, in the measurement period. The busy state means a state in which the disk drive that configures the data volume is running. For that reason, in the case where the data volume is the virtualized data volume, no value is stored in the busy rate 1234.

The measurement period 1235 is a period of time during which the data transfer rate 1233 and the busy rate 1234 of the record have been measured.

The data volume performance data 123 manages a history of the information related to the performances of the respective data volumes. The data volume performance data 123 may include not the data transfer size 1233 and the busy rate 1234, but other information on the performance of the data volume. For example, the data volume performance data 123 may include the number of times of input/output accesses per one second or a response time.

Subsequently, a description will be given of a process of updating the data volume performance data 123 of the data storage apparatus 101 to 103.

The data storage apparatus 101 to 103 periodically measures the data transfer sizes and the busy rates of the respective data volumes.

Subsequently, the data storage apparatus 101 to 103 produces a new record in the data volume performance data 123. Then, the data storage apparatus 101 to 103 stores the identifier of the data volume whose performance has been measured in the data volume number 1232 of the new record. Then, the data storage apparatus 101 to 103 stores the data transfer size thus measured in the data transfer size 1233 of the new record. Then, the data storage apparatus 101 to 103 stores the measured busy rate in the busy rate 1234 of the new record. Then, the data storage apparatus 101 to 103 stores a period of time during which the performance has been measured in the measurement period 1235 of the new record.

As described above, the data storage apparatus 101 to 103 updates the data volume performance data 123.

FIG. 10 is a structural diagram showing the RAID group performance data 125 of the data storage apparatus B 102 according to the first embodiment.

The RAID group performance data 125 includes RAID group numbers 1252, busy rates 1253, and measurement periods 1254.

The RAID group numbers 1252 are unique identifiers of the RAID group 200, etc. of the data storage apparatus B 102. The busy rate 1253 is a rate of the time of a busy state, which is in the RAID group 200, etc., in the measurement period. The busy state means a state in which the disk drive that configures the RAID group 200, etc. is running.

The measurement period 1254 is a period of time during which the busy rate 1253 of the record has been measured.

The RAID group performance data 125 manages a history of the information related to the performances of the respective RAID groups 200, etc. The RAID group performance data 125 may include not the busy rate 1253, but other information on the performance of the RAID group 200, etc. For example, the RAID group performance data 125 may include the number of times of input/output accesses per one second or a response time.

The data storage apparatus A 101 and the data storage apparatus C 103 also include the same RAID group performance data 125 as that of the data storage apparatus B 102.

Subsequently, a description will be given of a process of updating the RAID group performance data 125 of the data storage apparatus 101 to 103.

The data storage apparatus 101 to 103 periodically measures the busy rates of the respective RAID groups 200, etc.

Subsequently, the data storage apparatus 101 to 103 produces a new record in the RAID group performance data 125. Then, the data storage apparatus 101 to 103 stores the identifier of the RAID group 200, etc. whose busy rate has been measured in the RAID group number 1252 of the new record. Then, the data storage apparatus 101 to 103 stores the busy ratio thus measured in the measurement period 1253 of the new record. Then, the data storage apparatus 101 to 103 stores a period of time during which the busy rate has been measured in the measurement period 1254 of the new record.

As described above, the data storage apparatus 101 to 103 updates the RAID group performance data 125.

FIG. 11 is a structural diagram showing the disk drive performance data 127 of the data storage apparatus 102 according to the first embodiment.

The disk drive performance data 127 includes disk drive numbers 1272, busy rates 1273, and measurement periods 1274.

The disk drive numbers 1272 are unique identifiers of the disk drives 161 to 168 of the data storage apparatus B 102. The busy rate 1273 is a rate of the time of a busy state, which is in the disk drive 161 to 168, in the measurement period. The busy state means a state in which the disk drive that configures the disk drive 161 to 168 is running.

The measurement period 1274 is a period of time during which the busy rate 1273 of the record has been measured.

The disk drive performance data 127 manages a history of the information related to the performances of the respective disk drives 161 to 168. The disk drive performance data 127 may include not the busy rate 1273, but other information on the performance of the disk drive 161 to 168. For example, the disk drive performance data 127 may include the number of times of input/output accesses per one second or a response time.

The data storage apparatus A 101 and the data storage apparatus C 103 also include the same disk drive performance data 127 as that of the data storage apparatus B 102.

Subsequently, a description will be given of a process of updating the disk drive performance data 127 of the data storage apparatus 101 to 103.

The data storage apparatus 101 to 103 periodically measures the busy rates of the respective disk drives 161 to 168.

Subsequently, the data storage apparatus 101 to 103 produces a new record in the disk drive performance data 127. Then, the data storage apparatus 101 to 103 stores the identifier of the disk drive whose busy rate has been measured in the disk drive number 1272 of the new record. Then, the data storage apparatus 101 to 103 stores the busy ratio thus measured in the busy ratio 1273 of the new record. Then, the data storage apparatus 101 to 103 stores a period of time during which the busy rate has been measured in the measurement period 1274 of the new record.

As described above, the data storage apparatus 101 to 103 updates the disk drive performance data 127.

In this embodiment, the administrator sets the measurement period 1215 of the FC port performance data 121 (FIGS. 8A and 8B), the measurement period 1235 of the data volume performance data 123 (FIGS. 9A and 9B), the measurement period 1254 of the RAID group performance data 125 (FIG. 10), and the measurement period 1274 of the disk drive performance data 127 (FIG. 11) to be identical with each other.

More specifically, the administrator sets the measurement interval of the performance of the data storage apparatus 101 to 103 using the management computer 500. The management computer 500 requires the measurement of the performances at set measurement intervals of all of the data storage apparatuses 101 to 103.

Upon receiving the requirement, the data storage apparatus 101 to 103 measures the performances of its structural site at the required measurement intervals. Then, the data storage apparatus 101 to 103 stores the measured performances in the performance data 121, 123, 125, and 127.

FIG. 12 is a structural diagram showing the management device information 522 of the management computer 500 according to the first embodiment.

The management device information 522 includes device types 5221, device names 5222, device number 5223, and IP addresses 5224.

The device numbers 5223 are unique identifiers of the devices that are managed by the management computer 500. The device types 5221 are the types of devices. That is, the device types 5221 indicate that the devices are the host computers or the data storage apparatuses.

The device names 5222 are the names of the devices. That is, the device names 5222 are identifiers by which the administrator identifies the devices. The IP addresses 5224 are the IP addresses of the devices.

The management device information 522 is registered by the administrator in advance.

Hereinafter, a description will be given in more detail of a process of transiting the performance report screen of the management computer 500.

First, the performance information report program 525 of the management computer 500 allows the data storage apparatus list screen to be displayed on the display 515.

Figure 13:
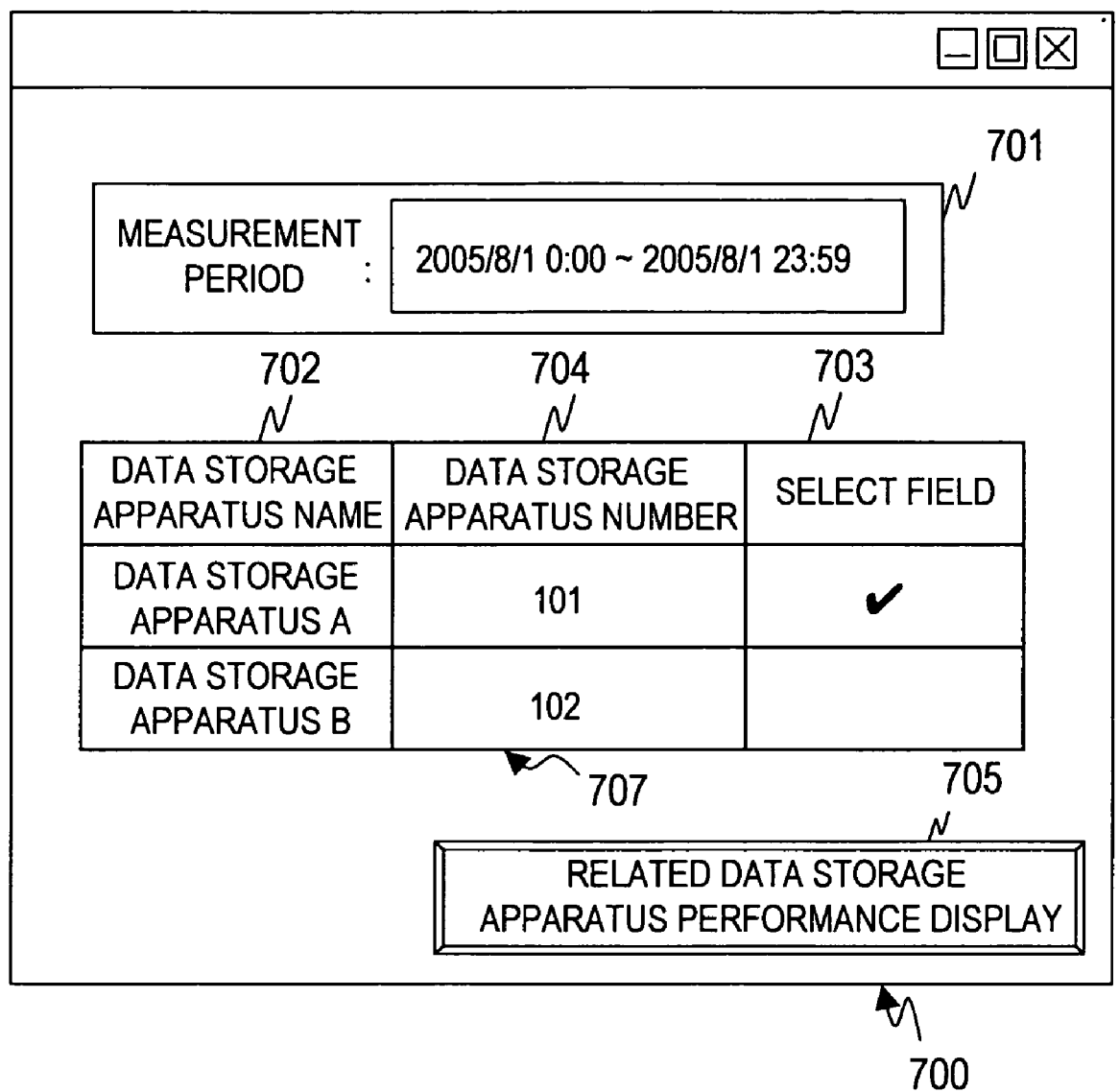
FIG. 13 is an explanatory diagram showing a data storage apparatus list screen that is displayed in the management computer according to the first embodiment.

FIG. 13 is an explanatory diagram showing a data storage apparatus list screen 700 that is displayed on the management computer 500 according to the first embodiment.

The data storage apparatus list screen 700 includes a measurement period input field 701, data storage apparatus select information 707, and a related data storage apparatus performance display button 705.

The measurement period input field 701 is inputted with the measurement period of the performance of the data storage apparatus 101 to 103. The administrator inputs a period of time to the measurement period input field 701. The measurement period input field 701 may select a value from a pull down menu.

The data storage apparatus select information 707 includes data storage apparatus names 702, data storage apparatus numbers 704, and select fields 703.

The data storage apparatus names 702 are names by which the administrator identifies the data storage apparatuses 101 to 103. The data storage apparatus numbers 704 are unique identifiers of the data storage apparatuses 101 to 103.

The select field 703 indicates whether a data storage apparatus 101 to 103 is selected or not. In the data storage apparatus list screen 700 of FIG. 13, the administrator selects the data storage apparatus A 101.

Then, the administrator operates the related data storage apparatus performance display button 705 to require, of the management computer 500, an acquisition of the information related to the performance of the data storage apparatus 101 to 103 of the record which is selected by the select field 703. In the case where no value is inputted to the measurement period 702, the administrator is not capable of operating the related data storage apparatus performance display button 705. Similarly, in the case where all of the data storage apparatus 101 to 103 is not selected by the select field 703, the administrator cannot operate the related data storage apparatus performance display button 705.

Subsequently, a description will be given of a process of producing a data storage apparatus list screen 700 of the management computer 500.

The performance information report program 525 of the management computer 500 prepares a template of the data storage apparatus list screen 700 in advance. Then, necessary information is stored in the template of the data storage apparatus list screen 700 that has been prepared in advance.

More specifically, the performance information report program 525 selects all of the records where "data storage apparatus" is stored in the device types 5221 of the management device information 522. Then, the performance information report program 525 extracts the device name 5222 and the device number 5223 of the selected record.

Subsequently, the performance information report program 525 stores the extracted device name 5222 in the data storage device name 702 of the data storage apparatus list screen 700. Then, the performance information report program 525 stores the extracted device number 5223 in the data storage apparatus number 704 of the data storage apparatus list screen 700.

As described above, the performance information report program 525 produces the data storage apparatus list screen 700. Then, the performance information report program 525 allows the produced data storage apparatus list screen 700 to be displayed on the display 515.

Subsequently, a description will be given of the processing of the management computer 500 in the case where the related data storage apparatus performance display button 705 of the data storage apparatus list screen 700 is operated by the administrator. In this embodiment, "2005/8/1 0:00 to 2005/8/1 23:59" is stored in the measurement period input field 701 of the data storage apparatus list screen 700. Also, the data storage apparatus A 101 is selected in the select field 703 of the data storage apparatus list screen 700.

When the related data storage apparatus performance display button 705 of the data storage apparatus list screen 700 is operated, the management computer 500 produces a target port performance information 610 which will be described with reference to FIG. 14 later. A process of producing the target port performance information 610 of the management computer 500 will be described with reference to FIG. 15.

Subsequently, the management computer 500 produces the target port performance screen, which will be described with reference to FIG. 16 later, on the basis of the produced target port performance information 610. Then, the management computer 500 allows the produced target port performance screen to be displayed on the display 515.

FIG. 14 is a structural diagram showing the target port performance information 620 of the management computer 500 according to the first embodiment.

The target port performance information 610 includes the data storage apparatus numbers 6110, host computer numbers 6115, FC port performance data 6120, data volume performance data 6130, real/virtual flags 6140, and measurement periods 6150.

The data storage apparatus numbers 6110 includes a unique identifier of the data storage apparatus 101 to 103. The host computer numbers 6115 include a unique identifier of the host computer 301 to 303 that accesses to the data storage apparatus 101 to 103.

The FC port performance data 6120 includes FC port numbers 6121, data transfer sizes 6123, and bandwidths 6125.

The FC port numbers 6121 are unique identifiers of the FC ports 150 through which a path that is allocated between the data storage apparatus 101 to 103 and the host computer 301 to 303 is routed. The data transfer sizes 6123 are data transfer sizes (MB/sec) of the FC ports 150 per unit time. The bandwidths 6125 are data transfer sizes (MB/sec) per unit time which can be physically transferred by the FC ports 150.

The data volume performance data 6130 includes the data volume number 6131 and the data transfer size 6133.

The data volume number 6131 is a unique identifier of the data volume which is accessed through the FC port 150. The data transfer size 6133 is the data transfer size (MB/sec) to the data volume per unit time.

The real/virtual flag 6140 indicates whether the data volume is capable of actually storing data or not. For example, in the case where the data volume is a logical data volume that is capable of actually storing data, "real" is stored in the real/virtual flag 6140. On the other hand, in the case where the data volume is a virtualized data volume that is incapable of actually storing data, "virtual" is stored in the real/virtual flag 6140.

The measurement period 6150 is a period of time during which the data transfer sizes 6123 and 6133 of the record have been measured.

Figure 15:
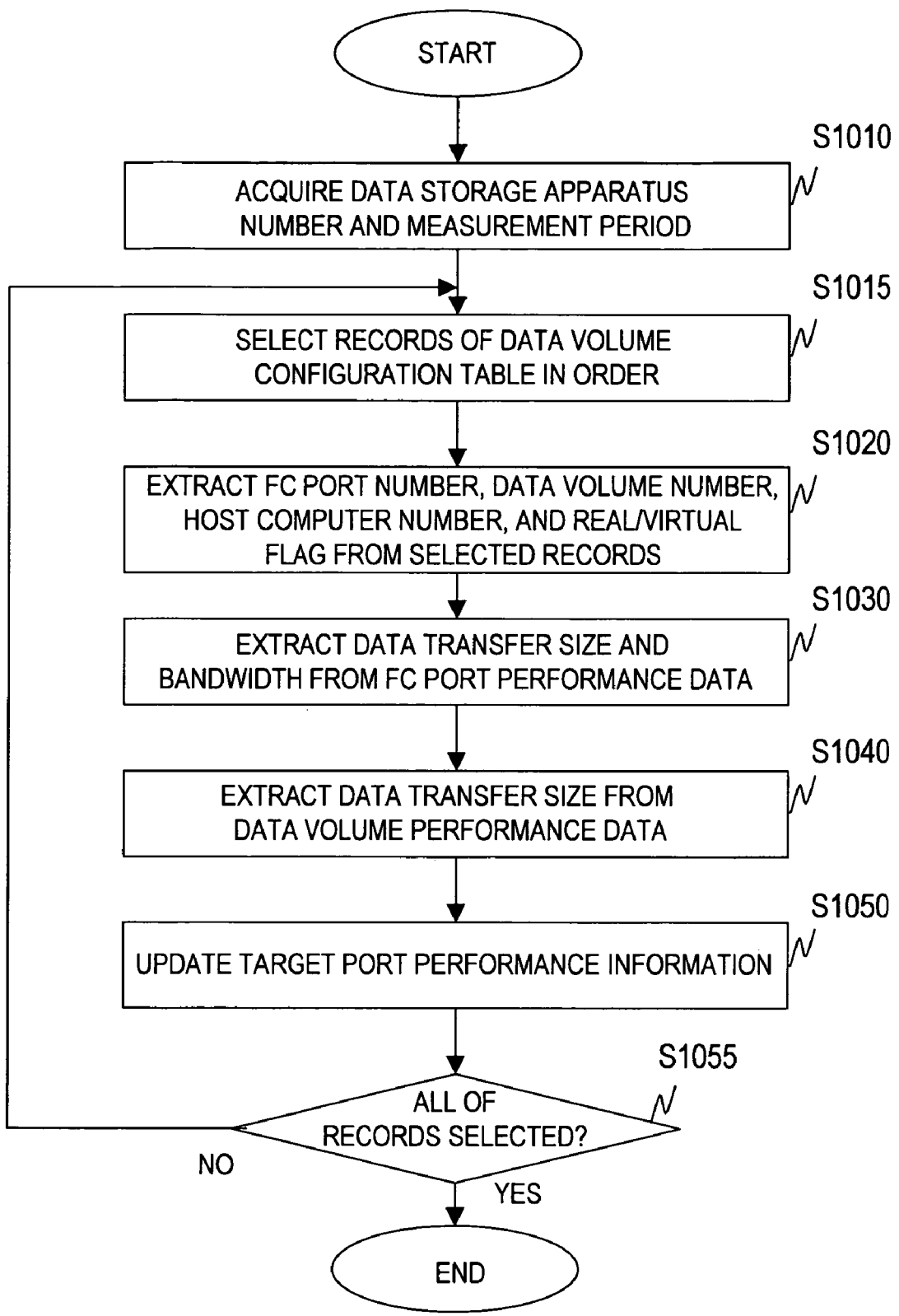
FIG. 15 is a flowchart showing a process of preparing the target port performance information of the management computer according to the first embodiment.

FIG. 15 is a flowchart showing a process of producing the target port performance information 620 of the management computer 500 according to the first embodiment.

When the related data storage apparatus performance display button 705 of the data storage apparatus list screen 700 is operated, the management computer 500 starts a process of producing the target port performance information 610.

First, the performance information report program 525 of the management computer 500 acquires the measurement period that has been inputted to the measurement period input field 701 of the data storage apparatus list screen 700. Then, the performance information report program 525 acquires the data storage apparatus number 704 of the record which has been selected by the select field 703 of the data storage apparatus list screen 700 (S1010).

In this embodiment, the performance information report program 525 acquires "2005/8/1 0:00 to 2005/8/1 23:59" of the measurement period from the measurement period input field 701 of the data storage apparatus list screen 700. Also, the performance information report program 525 acquires "101" of the data storage apparatus number 704 of the record which has been selected by the select field 703 of the data storage apparatus list screen 700.

Subsequently, the configuration information acquisition program 521 of the management computer 500 specifies the data storage apparatus A 101 corresponding to "101" of the data storage apparatus number 704 which has been acquired by the performance information report program 525. Then, the configuration information acquisition program 521 selects all of the records of the data volume configuration table 122 (FIG. 5) of the specified data storage apparatus A 101 in order (S1015). Then, the management computer 500 repeats the processes of Steps S1020 to S1050 with respect to the selected record.

The configuration information acquisition program 521 extracts the FC port number 1221, the data volume number 1222, the host computer number 1223, and the real/virtual flag 1224 from the selected record (S1020).

Subsequently, the performance data acquisition program 523 of the management computer 500 specifies the data storage apparatus A 101 corresponding to "101" of the data storage apparatus number 704 which has been acquired by the performance information report program 525. Then, the performance data acquisition program 523 extracts information related to the performance of the FC port 150 of the data storage apparatus A 101 from the FC port performance data 121 (FIG. 8A) of the specified data storage apparatus A 101.

In this embodiment, the performance data acquisition program 523 selects, from the FC port performance data 121 of the data storage apparatus A 101, all of the records in which the FC port number 1221 that has been extracted by the configuration information acquisition program 521 coincides with the FC port number 1212 of the FC port perform information 121. Then, the performance data acquisition program 523 specifies the records in which the measurement period that has been acquired by the performance information report program 525 coincides with the measurement period 1215 of the FC port performance data 121 from the selected records.

Then, the performance data acquisition program 523 extracts the data transfer size 1213 and the bandwidth 1214 from the specified records (S1030).

Subsequently, the performance data acquisition program 523 extracts the information related to the performance of the data volume of the data storage apparatus A 101 from the data volume performance data 123 (FIG. 9A) of the data storage apparatus A 101.

In this embodiment, the performance data acquisition program 523 selects, from the data volume performance data 123 of the data storage apparatus A 101, all of the records in which the data volume number 1222 that has been extracted by the configuration information acquisition program 521 in Step S1020 coincides with the data volume number 1232 of the data volume performance data 123. Then, the performance data acquisition program 523 specifies, from the selected records, the records in which the measurement period that has been acquired by the performance information report program 525 coincides with the measurement period 1235 of the data volume performance data 123.

Then, the performance data acquisition program 523 extracts the data transfer size 1233 from the specified records (S1040).

Then, the performance information report program 525 updates the target port performance information 610 (S1050).

More specifically, the performance information report program 525 stores the data storage apparatus number that has been acquired in Step S1010 in the data storage apparatus number 6110 of the target port performance information 610.

Then, the performance information report program 525 stores the host computer number 1223 that has been extracted by the configuration information acquisition program 521 in Step S1020 in the host computer number 6115 of the target port performance information 610. Then, the performance information report program 525 stores the FC port number 1221 that has been extracted by the configuration information acquisition program 521 in Step S1020 in the FC port number 6121 of the target port performance information 610.

Subsequently, the performance information report program 525 stores the data transfer size 1213 that has been extracted by the performance data acquisition program 523 in Step S1030 in the data transfer size 6123 of the target port performance information 610. Then, the performance information report program 525 stores the bandwidth 1214 that has been extracted by the performance data acquisition program 523 in Step S1030 in the bandwidth 6125 of the target port performance information 610.

Then, the performance information report program 525 stores the data volume number 1222 that has been extracted by the configuration information acquisition program 521 in Step S1020 in the data volume number 6131 of the target port performance information 610. Then, the performance information report program 525 stores the data transfer size 1233 that has been extracted by the performance data acquisition program 523 in Step S1040 in the data volume size 6133 of the target port performance information 610.

Then, the performance information report program 525 stores the real/virtual flag 1224 that has been extracted by the configuration information acquisition program 521 in Step S1020 in the real/virtual flag 6140 of the target port performance information 610. Then, the performance information report program 525 stores the measurement period that has been extracted in Step S1010 in the measurement period 6150 of the target port performance information 610.

In this way, the performance information report program 525 updates the target port performance information 610.

Subsequently, the performance information report program 525 determines whether or not the configuration information acquisition program 521 has selected all of the records of the data volume configuration table 122 in Step S1015 (S1055).

When the performance information report program 525 determines that the configuration information acquisition program 521 has not selected all of the records, the processing is returned to Step S1015. Then, the management computer 500 repeats the processes of Steps S1015 to S1050 with respect to the records that have not been selected.

On the other hand, when the performance information report program 525 determines that the configuration information acquisition program 521 has selected all of the records, the process of producing the target port performance information 620 is finished.

The management computer 500 may select the host computer 301 to 303 in the data storage apparatus list screen 700.

In this case, the configuration information acquisition program 521 of the management computer 500 specifies the identifier of the host computer 301 to 303 that has been selected by the data storage apparatus list screen 700. Then, in Step S1015, the configuration information acquisition program 521 selects only the records in which the specified identifier coincides with the host computer number 1223 of the data volume configuration table 122 from the data volume configuration table 122. As a result, the management computer 500 can store only the information related to the FC port 150 through which a path that is allocated to the host computer 301 to 303 that has been selected in the data storage apparatus list screen 700 is routed in the target port performance information 610.

When the performance information report program 525 has produced the target port performance information 610, the performance information report program 525 produces the target port performance screen on the basis of the target port performance information 610. Then, the performance information report program 525 allows the produced target port performance screen to be displayed on the display 515.

Figure 16:
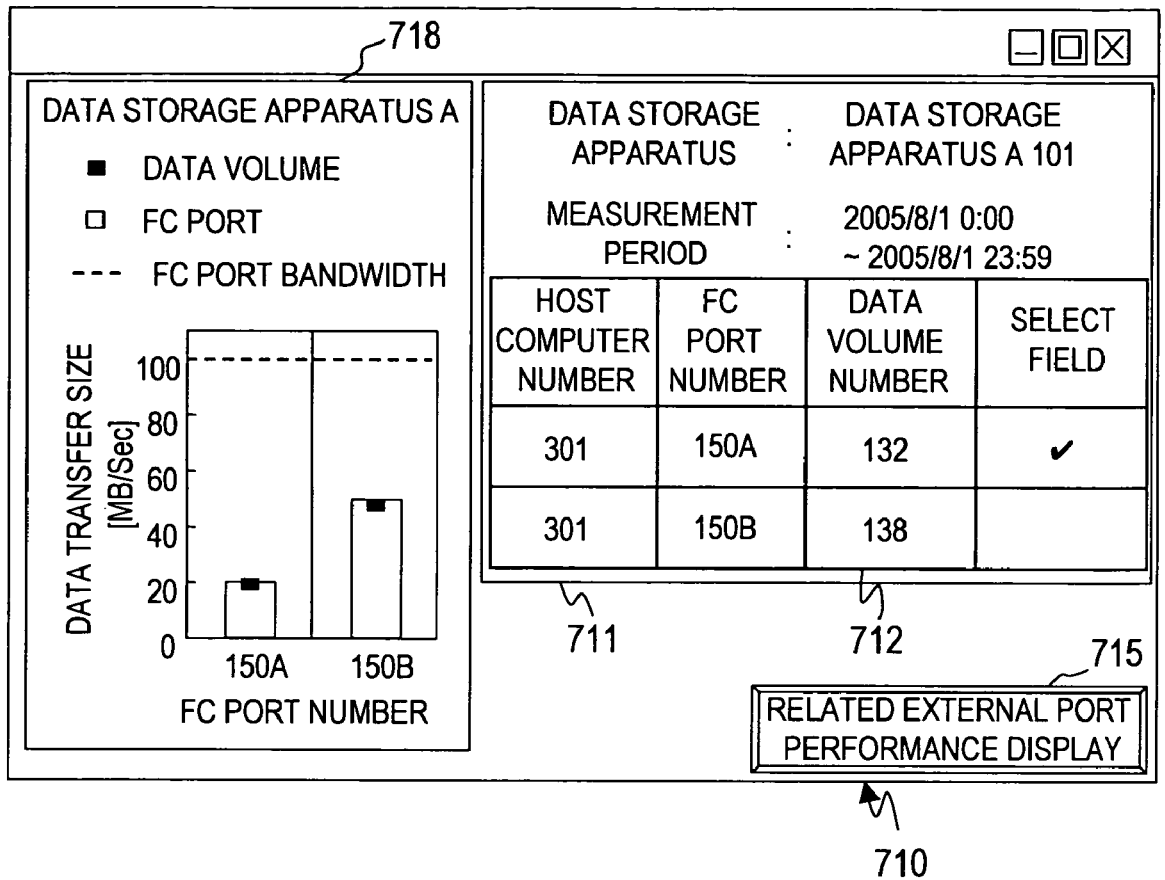
FIG. 16 is an explanatory diagram showing a target port performance screen which is displayed in the management computer according to the first embodiment.

FIG. 16 is an explanatory diagram showing a target port performance screen 710 that is displayed on the management computer 500 according to the first embodiment.

The target port performance screen 710 includes data volume select information 711, a performance graph 718, and a related external port performance display button 715.

The data volume select information 711 includes some or all of the target port performance information 610. Also, the data volume select information 711 includes the select field 712.

The data volume select information 711 shown in FIG. 16 includes data storage apparatus numbers 6110, measurement periods 6150, host computer numbers 6115, FC port numbers 6121, and data volume numbers 6131 of the target port performance information 610.

The select field 712 indicates whether the data volume of the record is selected, or not. In the target port performance screen 710 shown in FIG. 16, the administrator selects the data volume 132 of the data storage apparatus A 101.

The performance graph 718 is produced on the basis of the target port performance information 610. The performance graph 718 shown in FIG. 16 is produced on the basis of the data transfer size 6123, the bandwidth 6125, and the data transfer size 6133 of the target port performance information 610. As a result, the performance graph 718 exhibits the performance related to the FC port 150 and the performance of the data volume that is accessed through the FC port 150.

The performance graph 718 is not limited to FIG. 18 but may be a graph of the different type such as a line graph. Also, the target port performance screen 710 may include a table indicative of the performance of the FC port 150 instead of the performance graph 718.

Subsequently, a description will be given of another display mode of the performance graph 718.

Figure 17:
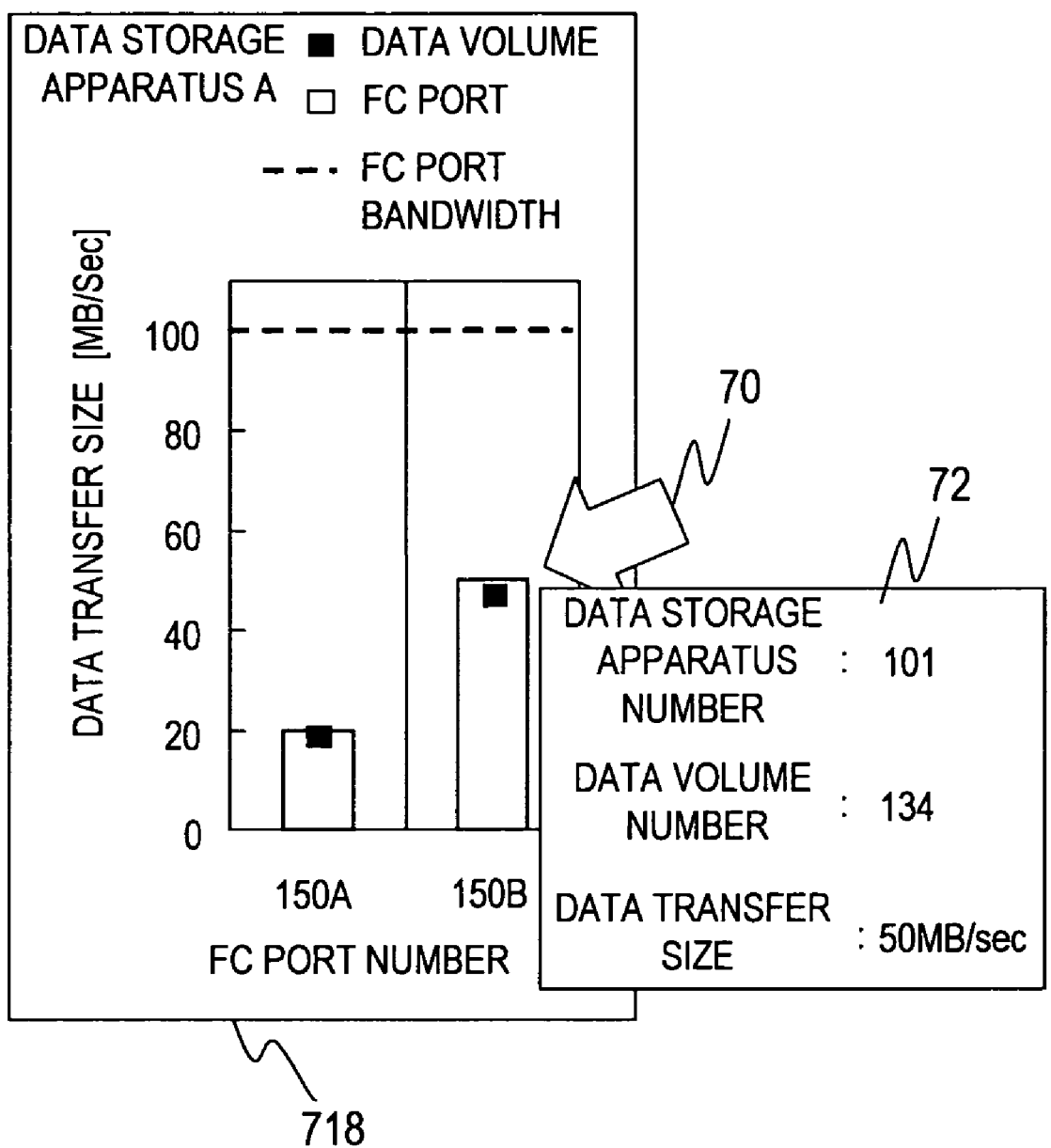
FIG. 17 is an explanatory diagram showing a display mode of the performance graph of the Target port performance screen according to the first embodiment.

FIG. 17 is an explanatory diagram showing a display mode of the performance graph 718 of the target port performance screen 710 according to the first embodiment.

When the performance graph 718 in the drawing is designated by a pointer 70, the management computer 500 may display information corresponding to a position that is designated by the pointer 70 as a popup screen 72. More specifically, the management computer 500 extracts the information corresponding to the position that is designated by the pointer 70 from the target port performance information 610. Then, the management computer 500 displays the extracted information as the popup screen 72.

Now, the description will be returned to FIG. 16.

The administrator analyzes the target port performance screen 710, thereby making it possible to grasp the status of the FC port 150 of the data storage apparatus A 101. According to the target port performance screen 710 shown in FIG. 16, the administrator grasps that the path is allocated between the FC port 150A and the data volume 132. Accordingly, the administrator can grasp that there occurs no competition of IO in the FC port 150A.

The administrator operates the related external port performance display button 715 so as to require the acquisition of the information related to the performance of the data volume of the records that have been selected in the select field 712, of the management computer 500.

When the related external port performance display button 715 is operated, the management computer 500 produces the external port performance information 620 which will be described with reference to FIG. 18 later. A process of producing the external port performance information 620 by the management computer 500 will be described with reference to FIG. 19 later.

Subsequently, the management computer 500 produces the external port performance screen, which will be described with reference to FIG. 20 later, on the basis of the produced external port performance information 620. Then, the management computer 500 allows the produced external port performance screen to be displayed on the display 515.

FIG. 18 is a structural diagram showing the external port performance information 620 of the management computer 500 according to the first embodiment.

The external port performance information 620 includes data storage apparatus numbers 6210, external port performance data 6220, data volume performance data 6230, external data storage apparatus numbers 6240, external data storage area numbers 6250, measurement periods 6260, and select flags 6270.

The data storage apparatus numbers 6210 are unique identifier of the data storage apparatus 101 to 103.

The external port performance data 6220 is information related to the performance of the external port. The external port is an FC port 150 through which a path that is allocated between the data storage apparatuses 101 to 103 is routed.

The external port performance data 6220 includes FC port numbers 6221, data transfer sizes 6223, and bandwidths 6225.

The FC port numbers 6221 are unique identifiers of the external ports of the data storage apparatus 101 to 103. The data transfer size 6223 is data transfer size (MB/sec) of the external port per unit time. The bandwidth 6225 is a data transfer size (MB/sec) that can be physically transferred by the external port per unit time.

The data volume performance data 6230 includes data volume numbers 6231 and data transfer sizes 6233.

The data volume numbers 6231 are unique identifiers of the data volume to which a path that is routed through the external port is allocated. The data transfer size 6233 is a data transfer size of the data volume per unit time (MB/sec).

The external data storage apparatus numbers 6240 are unique identifiers of the data storage apparatus 101 to 103, which are accessed through the external port. That is, the external data storage apparatus numbers 6240 are unique identifiers of the data storage apparatus 101 to 103, to which the data required to be written in the data storage apparatus 101 to 103 corresponding to the data storage apparatus number 6210, is transferred.

The external data storage area number 6250 are unique identifiers of the data volumes that are accessed through the external ports. That is, the external data storage apparatus numbers 6250 are unique identifiers of the data volumes to which the data required to be written in the data volume corresponding to the data volume number 6231 is transferred.

The measurement period 6260 is a period of time during which the data transfer size 6223, the bandwidth 6225, and the data transfer size 6233 of the record have been measured. The select flag 6270 indicates that the data volume is a data volume on a path that is selected by the administrator.

Figure 19:
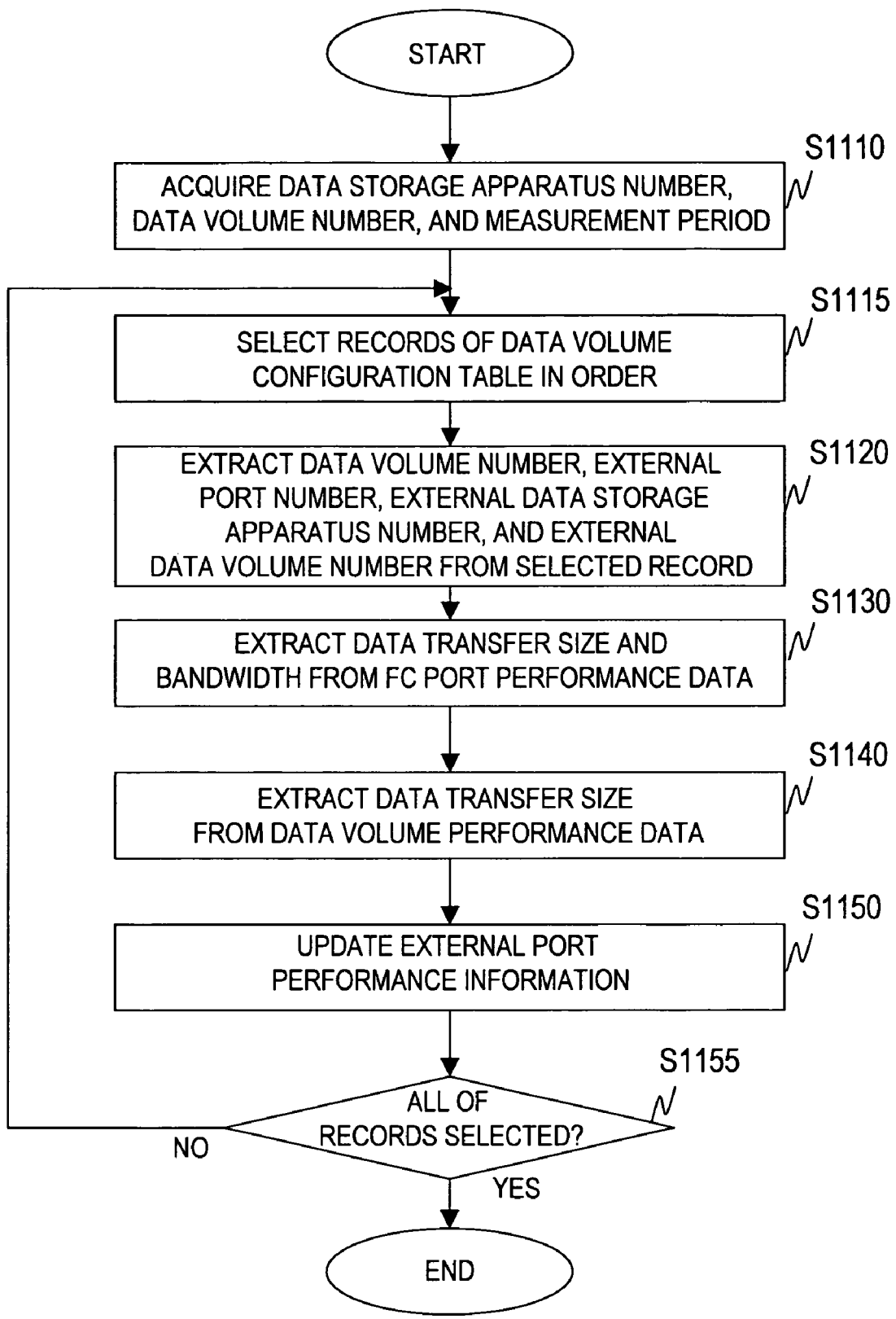
FIG. 19 is a flowchart showing a process of preparing the external port performance data of the management computer according to the first embodiment.

FIG. 19 is a flowchart showing a process of producing the external port performance information 620 of the management computer 500 according to the first embodiment.

When the related external port performance display button 715 of the target port performance screen 710 is operated, the management computer 500 starts the process of producing the external port performance information 620.

First, the performance information report program 525 of the management computer 500 acquires information that is designated by the target port performance screen 710. More specifically, the performance information report program 525 acquires the data storage apparatus number and the measurement period from the target port performance screen 710. In addition, the performance information report program 525 acquires the data volume number of the record that has been selected by the select field 712 of the target port performance screen 710 (S1110).

In this embodiment, the performance information report program 525 acquires "101" of the data storage apparatus number, "132" of the data volume number, and "2005/8/1 0:00 to 2005/8/1 23:59" of the measurement period.

Subsequently, the configuration information acquisition program 521 of the management computer 500 specifies the data storage apparatus A 101 corresponding to "101" of the data storage apparatus number which is acquired by the performance information report program 525. Then, the configuration information acquisition program 521 selects all of the records of the data volume configuration table 122 (FIG. 5) of the specified data storage apparatus A 101 in order (S1115). Then, the management computer 500 repeats the process of Steps S1120 to S1 150 with respect to the selected record.

The configuration information acquisition program 521 extracts the data volume number 1222, the external port number 1225, the external data storage apparatus number 1226, and the external data storage area number 1228 from the selected record (S1120).

Then, the performance data acquisition program 523 of the management computer 500 specifies the data storage apparatus A 101 corresponding to "101" of the data storage apparatus number that is acquired by the performance information report program 525. Subsequently, the information related to the performance of the external port is extracted from the FC port performance data 121 (FIG. 8A) of the specified data storage apparatus A 101.

In this embodiment, the performance data acquisition program 523 selects all of the records in which the external port number 1225 that is extracted by the configuration information acquisition program 521 coincides with the FC port performance number 1212 of the FC port performance data 121 from the FC port performance data 121 of the data storage apparatus A 101. Then, the performance data acquisition program 523 specifies the records in which the measurement period that has been acquired by the performance information report program 525 coincides with the measurement period 1215 of the FC port performance data 121 from the selected records.

Then, the performance data acquisition program 523 extracts the data transfer size 1213 and the bandwidth 1214 from the specified record (S1130).

Then, the performance data acquisition program 523 extracts the information related to the performance of the data volume from the data volume performance data 123 (FIG. 9A) of the data storage apparatus A 101.

In this embodiment, the performance data acquisition program 523 selects all of the records in which the data volume number 1222 that is extracted by the configuration information acquisition program 521 in Step S1120 coincides with the data volume number 1232 of the data volume performance data 123 from the data volume performance data 123 of the data storage apparatus A 101. Then, the performance data acquisition program 523 specifies the records in which the measurement period that has been acquired by the performance information report program 525 coincides with the measurement period 1235 of the data volume performance data 123 from the selected records.

Then, the performance data acquisition program 523 extracts the data transfer size 1233 from the specified records (S1140).

Subsequently, the performance information report program 525 updates the external port performance information 620 (S1150).

More specifically, the performance information report program 525 stores the data storage apparatus number that has been acquired in Step S1110 in the data storage apparatus number 6210 of the external port performance information 620. Then, the performance information report program 525 stores the external port number 1225 that has been extracted by the configuration information acquisition program 521 in Step S1120 in the FC port number 6221 of the external port performance information 620.

Subsequently, the performance information report program 525 stores the data transfer size 1213 that has been extracted by the performance data acquisition program 523 in the data transfer size 6223 of the external port performance information 620. Then, the performance information report program 525 stores the bandwidth 1214 that has been extracted by the performance data acquisition program 523 in Step S1130 in the bandwidth 6225 of the external port performance information 620.

Thereafter, the performance information report program 525 stores the data volume number 1222 that has been extracted by the configuration information acquisition program 521 in Step S1120 in the data volume number 6231 of the external port performance information 620. Then, the performance information report program 525 stores the data transfer size 1233 that has been extracted by the performance data acquisition program 523 in Step S1140 in the data transfer size 6233 of the external port performance information 620.

Then, the performance information report program 525 stores the external data storage apparatus number 1226 that has been extracted by the configuration information acquisition program 521 in Step S1120 in the external data storage apparatus number 6240 of the external port performance information 620. Then, the performance information report program 525 stores the external data storage area number 1228 that has been extracted by the configuration information acquisition program 521 in Step S1120 in the external data storage area number 6250 of the external port performance information 620. Thereafter, the performance information report program 525 stores the measurement period that has been acquired in Step S1110 in the measurement period 6260 of the external port performance information 620.

Subsequently, the performance information report program 525 selects, from the external port performance information 620, the records in which the data volume number that has been acquired in Step S1110 coincides with the data volume number 6231 of the external port performance information 620. Then, the performance information report program 525 stores an asterisk "*" in the select flag 6270 of the selected record.

In the above manner, the performance information report program 525 updates the external port performance information 620.

Subsequently, the performance information report program 525 determines in Step S1115 whether or not the configuration information acquisition program 521 has selected all of the records of the data volume configuration table 122 (S1115).

When the performance information report program 525 determines that the configuration information acquisition program 521 has not selected all of the records, the processing returns to Step S1115. Then, the management computer 500 repeats the processes of Steps S115 to S1150 with respect to the unselected records.

On the other hand, when the performance information report program 525 determines that the configuration information acquisition program 521 has selected all of the records, the process of producing the external port performance information 620 is finished.

Alternatively, in Step S1115, the configuration information acquisition program 521 may select, from the data volume configuration table 122, only the records in which the data volume number that has been acquired by the performance information report program 525 in Step S1110 coincides with the data volume number 1222 of the data volume configuration table 122. As a result, the management computer 500 is capable of storing only the information corresponding to the data volume that has been selected by the select field 712 of the target port performance screen 710 in the external port performance information 620.

Upon producing the external port performance information 620, the performance information report program 525 produces an external port performance screen on the basis of the external port performance information 620. Then, the performance information report program 525 allows the produced external port performance screen to be displayed on the display 515.

Figure 20:
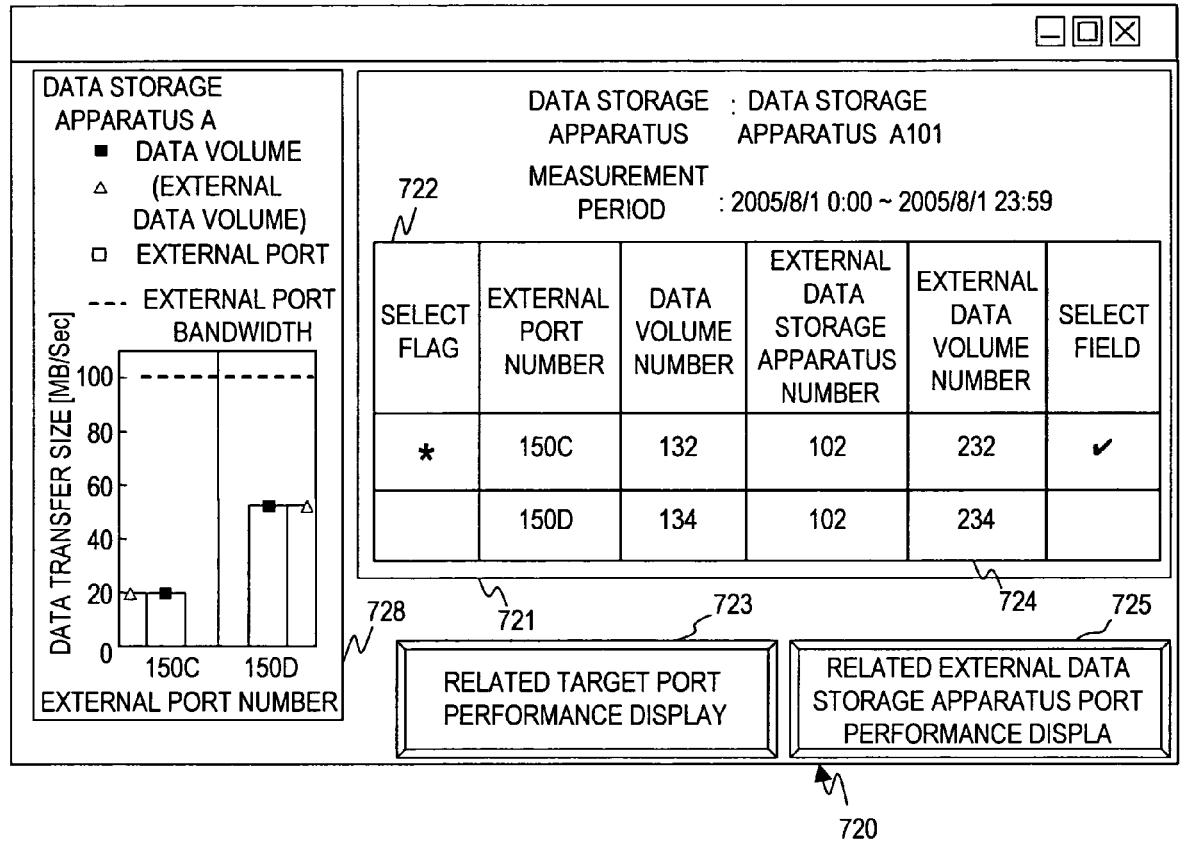
FIG. 20 is an explanatory diagram showing an external port performance screen that is displayed in the management computer according to the first embodiment.

FIG. 20 is an explanatory diagram showing the external port performance screen 720 that is displayed in the management computer 500 according to the first embodiment.

The external port performance screen 720 includes data volume select information 721, a performance graph 728, a related target port performance display button 723, and a related external data storage port performance display button 725.

The data volume select information 721 includes some or all of the external port performance information 620. Also, the data volume select information 721 includes a select field 724.

The data volume select information 721 shown in FIG. 20 includes data storage apparatus numbers 6210, measurement periods 6260, select flags 6270, FC port numbers 6221, data volume numbers 6231, external data storage apparatus numbers 6240, and external data storage area numbers 6250 of the external port performance information 620.

The select field 724 indicates whether the data volume of the record is selected or not. In the external port performance screen 720, the administrator selects the virtualized data volume 132 of the data storage apparatus A 101.

The performance graph 728 is produced on the basis of the external port performance information 620. The performance graph 728 shown in FIG. 20 is produced on the basis of the data transfer size 6223, the bandwidth 6225, and the data transfer size 6233 of the external port performance information 620. As a result, the performance graph 728 shown in the figure exhibits the performance of the external port. In addition, the performance graph 728 shown in the figure exhibits the performance of the data volume to which a path that is routed through the external port is allocated.

In the performance graph 728, the graph related to the record in which "*" is stored in the select flag 6270 of the external port performance information 620 may be emphasized or flickered. With this structure, the administrator is capable of readily grasping the performance related to the data volume on the selected path from the performance graph 728.

The performance graph 728 is not limited to FIG. 20 but may be a graph of the different type such as a line graph. Also, the external port performance screen 720 may include a table that exhibits the performance of the external port instead of the performance graph 728.

In addition, the performance graph 728 indicates the existence of the external data storage area corresponding to the data volume on the path that has been selected by the administrator by triangle. As a result, the administrator is capable of recognizing that the path needs to be further tracked in order to investigate the competition of IO in the data volume.

The administrator analyzes the external port performance screen 720, thereby making it possible to grasp the status of the external port. According to the external port performance screen 720 shown in the figure, the administrator can grasp the status of the FC port 150C that is an external port. More specifically, the administrator grasps that a path is allocated only between the FC port 150C and the data volume 132. Accordingly, the administrator can grasp that there occurs no competition of IO in the FC port 150C.

When the related target port performance display button 723 is operated, the management computer 500 allows the target port performance screen 710 (FIG. 16) to be displayed on the display 515.

When the related external data storage port performance display button 725 is operated, the management computer 500 produces the external data storage port performance information 630 which will be described with reference to FIG. 21 later. The process of producing the external data storage port performance information 630 by the management computer 500 will be described with reference to FIG. 22 later.

Subsequently, the management computer 500 produces the external data storage port performance screen, which will be described with reference to FIG. 23 later, on the basis of the produced external data storage port performance information 630. Then, the management computer 500 allows the produced external data storage port performance screen to be displayed on the display 515.

FIG. 21 is a structural diagram showing the external data storage port performance information 630 according to the first embodiment.

The external data storage port performance information 630 includes data storage apparatus numbers 6310, host computer number 6315, FC port performance data 6320, data volume performance data 6330, measurement periods 6340, and select flags 6350.

The data storage apparatus numbers 6310 are unique identifiers of the data storage apparatus 101 to 103. The host computer number 6315 is unique identifier of the host computer 301 to 303, which accesses the data storage apparatus 101 to 103.

The FC port performance data 6320 includes FC port numbers 6321, data transfer sizes 6323, and bandwidths 6325.

The FC port numbers 6321 are unique identifiers of the FC port 150 through which a path that is penetrated between the data storage apparatus 101 to 103, and the host data storage apparatus 101 to 103 is routed. The data transfer sizes 6323 are data transfer sizes (MB/sec) of the FC port 150 per unit time. The bandwidths 6325 are data transfer sizes (MB/sec) per unit time which can be physically transferred by the FC port 150.

The data volume performance data 6330 includes data volume numbers 6331 and data transfer sizes 6333.

The data volume numbers 6331 are unique identifiers of the data volumes that are accessed through the FC port. The data transfer sizes 6333 are data transfer sizes (MB/sec) to the data volume per unit time.

The measurement periods 6340 are periods of time during which the data transfer size 6323, the bandwidth 6325, and the data transfer size 6333 of the record have been measured. The select flag 6350 indicates the data volume on the path which is selected by the administrator.

Figure 22:
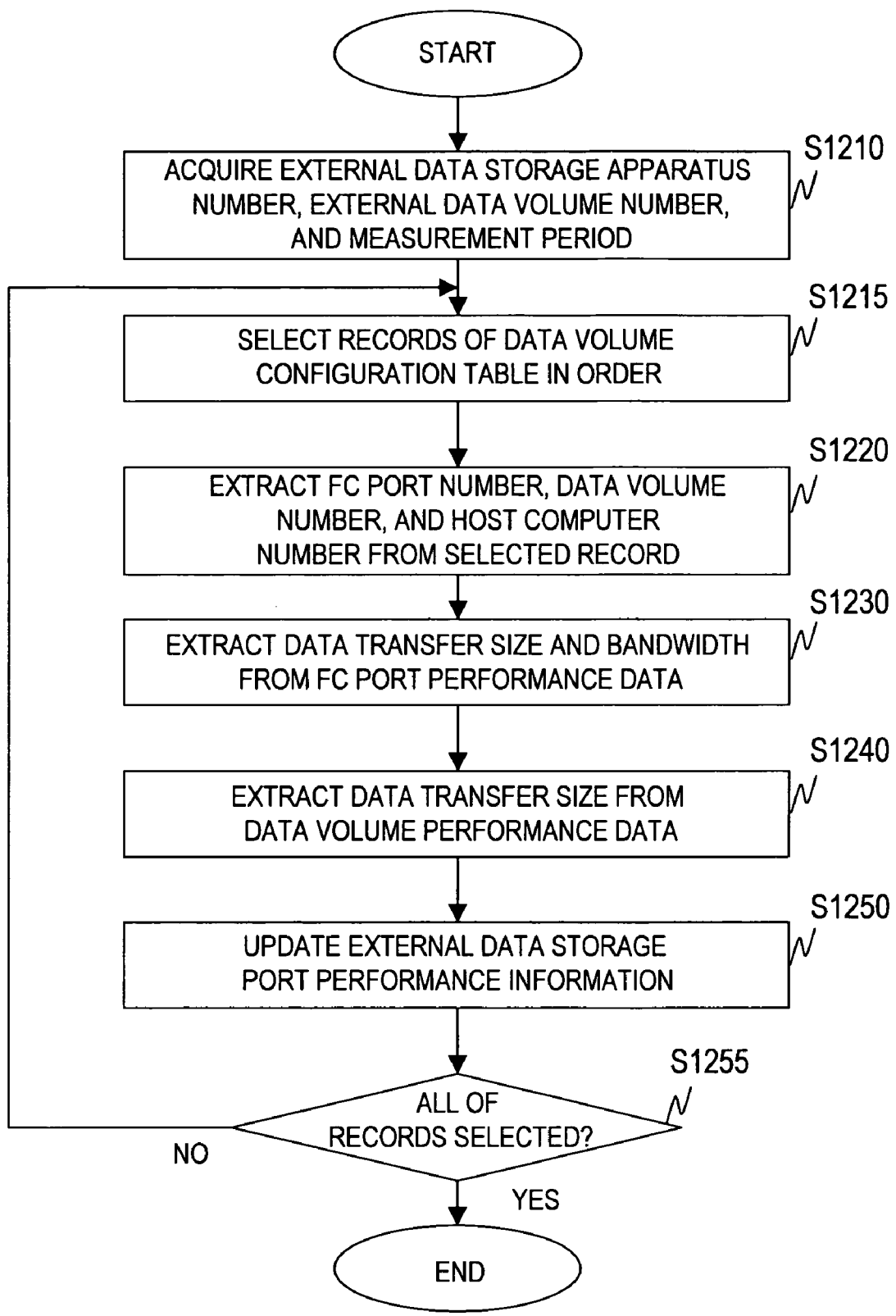
FIG. 22 is a flowchart showing a process of preparing the external data storage port performance information of the management computer according to the first embodiment.

FIG. 22 is a flowchart showing a process of producing the external data storage port performance information 630 of the management computer 500 according to the first embodiment.

When the related external data storage port performance display button 725 of the external port performance screen 720 is operated, the management computer 500 starts the process of producing the external data storage port performance information 630.

First, the performance information report program 525 of the management computer 500 acquires information that is designated by the external port performance screen 720. More specifically, the performance information report program 525 acquires the measurement period from the external port performance screen 720. In addition, the performance information report program 525 acquires the external data storage apparatus number and external data storage area number of the record that has been selected by the select field 724 of the external port performance screen 720 (S1210).

In this embodiment, the performance information report program 525 acquires "102" of the external data storage apparatus number, "232" of the external data storage area number, and "2005/8/1 0:00 to 2005/8/1 23:59" of the measurement period.

Subsequently, the configuration information acquisition program 521 of the management computer 500 specifies the data storage apparatus B 102 corresponding to "102" of the external data storage apparatus number that is acquired by the performance information report program 525. Then, the configuration information acquisition program 521 selects all of the records of the data volume configuration table 1.22 of the specified data storage apparatus B 102 in order (S1215). Then, the management computer 500 repeats the processes of Steps S1220 to Steps S1250 with respect to selected record.

The configuration information acquisition program 521 extracts the FC port number 1221, the data volume number 1222, and the host computer number 1223 from the selected record (S1220).

The performance data acquisition program 523 of the management computer 500 specifies the data storage apparatus B 102 corresponding to "102" of the external data storage apparatus number which is acquired by the performance information report program 525. Then, the performance data acquisition program 523 extracts the information related to the performance of the FC port from the FC port performance data 121 (FIG. 8B) of the specified data storage apparatus B 102.

In this embodiment, the performance data acquisition program 523 selects all of the records in which the FC port number 1221 that has been extracted by the configuration information acquisition program coincides with the FC port number 1212 of the FC port performance data 121 from the FC port performance data 121 of the data storage apparatus B102. Then, the performance data acquisition program 523 specifies, from the selected record, the records in which the measurement period that has been acquired by the performance information report program 525 coincides with the measurement period 1215 of the FC port performance data 121.

Then, the performance data acquisition program 523 extracts the data transfer size 1213 and the bandwidth 1214 from the specific record (S1230).

Subsequently, the performance data acquisition program 523 extracts the information related to the performance of the data volume from the data volume performance data 123 (FIG. 9B) of the data storage apparatus B102.

In this embodiment, the performance data acquisition program 523 selects, from the data volume performance data 123, all of the records in which the data volume number 1222 that has been extracted by the configuration information acquisition program 521 in Step S1220 coincides with the data volume number 1232 of the data volume performance data 123. Then, the performance data acquisition program 523 specifies, from the selected record, the records in which the measurement period that has been acquired by the performance information report program 525 coincides with the measurement period 1235 of the data volume performance data 123.

Then, the performance data acquisition program 523 extracts the data transfer size 1233 from the specific record (S1240).

Subsequently, the performance information report program 525 updates the external data storage port performance information 630 (S1250).

More specifically, the performance information report program 525 stores the external data storage apparatus number that has been acquired in Step S1210 in the data storage apparatus number 6310 of the external data storage port performance information 630. Then, the performance information report program 525 stores the host computer number 1223 that has been extracted by the configuration information acquisition program 521 in Step S1220 in the host computer number 6315 of the external data storage port performance information 630.

Then, the performance information report program 525 stores the FC port number 1221 that has been extracted by the configuration information acquisition program 521 in Step S1220 in the FC port number 6321 of the external data storage port performance information 630. Then, the performance information report program 525 stores the data transfer size 1213 that has been extracted by the performance data acquisition program 523 in Step S1230 in the data transfer size 6323 of the external data storage port performance information 630. Then, the performance information report program 525 stores the bandwidth 1214 that has been extracted by the performance data acquisition program 523 in Step S1230 in the bandwidth 6325 of the external data storage port performance information 630.

Subsequently, the performance information report program 525 stores the data volume number 1222 that has been extracted by the configuration information acquisition program 521 in Step S1220 in the data volume number 6331 of the external data storage port performance information 630. Then, the performance information report program 525 stores the data transfer size 1233 that has been extracted by the performance data acquisition program 523 in Step S1240 in the data transfer size 6333 of the external data storage port performance information 630.

Then, the performance information report program 525 stores the measurement period that has been acquired in Step S1210 in the measurement period 6340 of the external data storage port performance information 630.

Subsequently, the performance information report program 525 selects, from the external data storage port performance information 630, the records in which the external data storage area number that has been acquired in Step S1210 coincides with the data volume number 6331 of the external data storage port performance information 630. Then, an asterisk "*" is stored in the select flag 6350 of the selected record.

In this manner, the performance information report program 525 updates the external data storage port performance information 630.

Subsequently, the performance information report program 525 determines whether or not the configuration information acquisition program 521 has selected all of the records of the data volume configuration table 122 in Step S1215 (S1255).

When the performance information report program 525 determines that the configuration information acquisition program 521 has not selected all of the records, the processing returns to Step S1215. Then, the management computer 500 repeats the processes of Steps S1215 to Steps S1250 with respect to the unselected records.

On the other hand, the performance information report program 525 determines that the configuration information acquisition program 521 has selected all of the records, the process of producing the external data storage port performance information 630 is finished.

In Step S1215, the configuration information acquisition program 521 may select, from the data volume configuration table 122, only the records in which the external data storage area number that has been acquired by the performance information report program 525 in Step S1210 coincides with the data volume number 1222 of the data volume configuration table 122. As a result, the management computer 500 can store only the information corresponding to the external data storage area that has been selected by the select field 724 of the external port performance screen 720 in the external data storage port performance information 630.

When producing the external data storage port performance information 630, the performance information report program 525 produces the external data storage port performance screen on the basis of the external data storage port performance information 630. Then, the performance information report program 525 allows the produced external data storage port performance screen to be displayed on the display 515.

Figure 23:
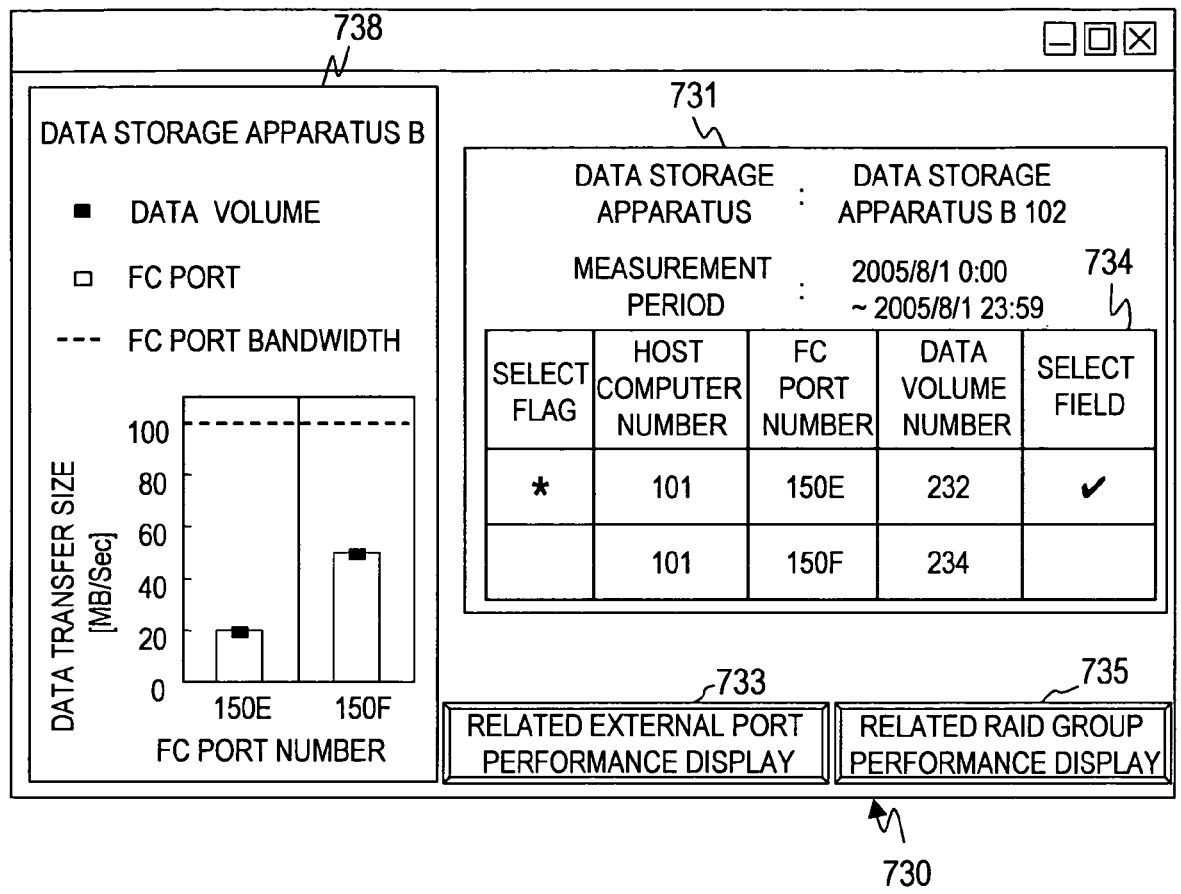
FIG. 23 is an explanatory diagram showing the external data storage port performance screen that is displayed in the management computer according to the first embodiment.

FIG. 23 is an explanatory diagram showing an external data storage port performance screen 730 that is displayed in the management computer 500 according to the first embodiment.

The external data storage port performance screen 730 includes data volume select information 731, a performance graph 738, a related external port performance display button 733, and a related RAID group performance display button 735.

The data volume select information 731 includes some or all of the external data storage port performance information 630. Also, the data volume select information 731 includes the select field 734.

The data volume select information 731 shown in FIG. 23 includes the data storage apparatus number 6310, measurement periods 6340, select flags 6350, host computer numbers 6315, FC port numbers 6321, and data volume numbers 6331 of the external data storage port performance information 630.

The select field 734 indicates whether the data volume of the record is selected or not. In the external data storage port performance screen 730 shown in the figure, the administrator selects the logical data volume 232 of the data storage apparatus B 102.

The performance graph 728 is produced on the basis of the external data storage port performance information 630. The performance graph 738 shown in the figure is produced on the basis of the data transfer size 6323, the bandwidth 6325, and the data transfer size 6333 of the external data storage port performance information 630. As a result, the performance graph 728 shown in the figure exhibits the performance of the FC port 150 of the data storage apparatus B 102 through which a path that is allocated between the high-order data storage apparatus A 101 and the low-order data storage apparatus B 102 is routed. In addition, the performance graph 728 shown in the figure exhibits the performance of the data volume that is accessed through the FC port 150.

In the performance graph 738, a graph related to the records where is stored in the select flag 6350 of the external data storage port performance information 630 may be emphasized or flickered. With this structure, the administrator can readily grasp the performance related to the selected data volume from the performance graph 738.

The performance graph 738 is not limited to this embodiment but may be a graph of the different type such as a line graph. Also, the external data storage port performance screen 730 may include, instead of the performance graph 738, a table that exhibits the performance of the FC port 150 of the data storage apparatus B102 and the performance of the data volume that is accessed through the FC port.

The administrator analyzes the external data storage port performance screen 730, thereby making it possible to grasp the status of the FC port 150E of the data storage apparatus B 102 that is externally connected to the data storage apparatus A 101. According to the external data storage port performance screen 730 shown in the figure, the administrator grasps that a path is allocated only between the FC port 150E and the data storage apparatus 232. With the above structure, the administrator is capable of grasping that there occurs no competition of IO in the FC port 150E.

When the related external port performance display button 733 is operated, the management computer 500 allows the external port performance screen 720 (FIG. 20) to be displayed on the display 515.

When the related RAID performance data button 735 is operated, the management computer 500 produces the RAID group performance information 640 which will be described with reference to FIG. 24 later. The process of producing the RAID group performance information 640 by the management computer 500 will be described with reference to FIG. 25 later.

Subsequently, the management computer 500 produces the RAID group performance screen, which will be described with reference to FIG. 26 later, on the basis of the produced RAID group performance information 640. Then, the management computer 500 allows the produced RAID group performance screen to be displayed on the display 515.

FIG. 24 is a structural diagram showing the RAID group performance information 640 of the management computer 500 according to the first embodiment.

The RAID group performance information 640 includes data storage apparatus numbers 6410, RAID group performance data 6420, data volume performance data 6430, measurement periods 6440, and select flags 6450.

The data storage apparatus numbers 6410 are unique identifiers of the data storage apparatus 101 to 103.

The RAID group performance data 6420 includes RAID group numbers 6421 and busy rates 6423.

The RAID group numbers 6421 are unique identifiers of the RAID group 200, etc., of the data storage apparatus 101 to 103. The busy rate 6423 is a rate of the time of a busy state, which is in the RAID group 200, etc., in the measurement period. The data volume performance data 6430 includes data volume numbers 6431 and busy rates 6433.

The data volume numbers 6431 are unique identifiers of the logical data volumes that belong to the RAID group 200, etc. The busy rate 6433 is a rate of the time of a busy state, which is in the logical data volume, in the measurement period.

The measurement periods 6440 are period of times during which the busy rates 6423 and 6433 of the records have been measured. The select flags 6450 indicate whether the logical data volume has been selected by the administrator or not.

Figure 25:
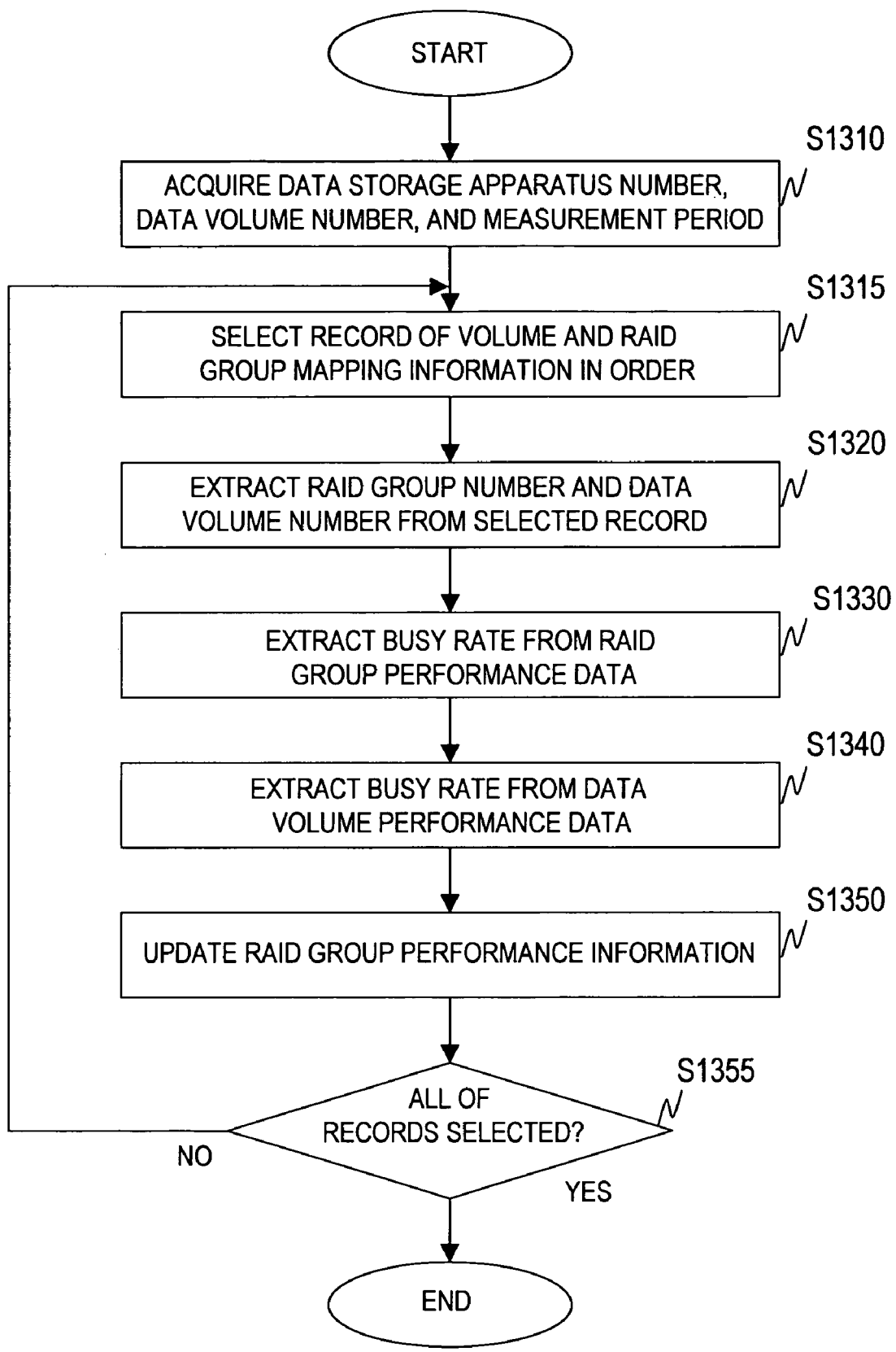
FIG. 25 is a flowchart showing a process of preparing the RAID group performance information of the management computer according to the first embodiment.

FIG. 25 is a flowchart showing a process of producing the RAID group performance information 640 by the management computer 500 according the first embodiment.

When the related RAID group performance display button 735 of the external data storage port performance screen 730 is operated, the management computer 500 starts the process of producing the RAID group performance information 640.

First, the performance information report program 525 of the management computer 500 acquires the information that is designated by the external data storage port performance screen 730. More specifically, the performance information report program 525 acquires the data storage apparatus number and the measurement period from the external data storage port performance screen 730. In addition, the performance information report program 525 acquires the data volume number of the record that has been selected by the select field 734 of the external data storage port performance screen 730 (S1310).

In this embodiment, the performance information report program 525 acquires "102" of the data storage apparatus number, "232" of the data volume number, and "2005/8/1 0:00 to 2005/8/1 23:59" of the measurement period.

Subsequently, the configuration information acquisition program 521 of the management computer 500 specifies the data storage apparatus B 102 corresponding to "102" of the external data storage apparatus number that has been acquired by the performance information report program 525. Then, the configuration information acquisition program 521 selects all of the records of the volume and RAID group mapping information 124 of the specified data storage apparatus B 102 in order (S1315). Then, the management computer 500 repeats the processes from Steps S1320 to Steps S1350 with respect to the selected records.

The configuration information acquirement program 521 extracts the data volume number 1241 and the RAID group number 1242 from the selected record (S1320).

Then, the performance data acquisition program 523 of the management computer 500 specifies the data storage apparatus B 102 corresponding to "102" of the external data storage apparatus number that has been acquired by the performance information report program 525. Then, the performance data acquisition program 523 extracts information related to the performance of the RAID group, 200 etc., from the RAID group performance data 125 (FIG. 10) of the specified data storage apparatus B 102.

In this embodiment, the performance data acquisition program 523 selects all of the records in which the RAID group number 1242 that has been extracted by the configuration information acquisition program 521 coincides with the RAID group number 1252 of the RAID group performance data 125 from the RAID group performance data 125 of the data storage apparatus B 102. Then, the performance data acquisition program 523 specifies the records in which the measurement period that has been acquired by the performance information report program 525 coincides with the measurement period 1254 of the RAID group performance data 125 from the selected record.

Then, the performance data acquisition program 523 extracts the busy rate 1253 from the specified record (S1330).

Subsequently, the performance data acquisition program 523 extracts information related to the performance of the data volume from the data volume performance data 123 (FIG. 9B) of the data storage apparatus B 102.

In this embodiment, the performance data acquisition program 523 selects, from the data volume performance data 123, all of the records in which the data volume number 1241 that has been acquired by the configuration information acquisition program 521 in Step 1320 coincides with the data volume number 1232 of the data volume performance data 123 from the data volume performance data 123 of the data storage apparatus B 102. Then, the performance data acquisition program 523 specifies the records in which the measurement period that has been acquired by the performance information report program 525 coincides with the measurement period 1235 of the data volume performance data 123 from the selected record.

Then, the performance data acquisition program 523 extracts the busy rate 1234 from the specified record (S1340).

Subsequently, the performance information report program 525 updates the RAID group performance information 640 (S1350).

More specifically, the performance information report program 525 stores the data storage apparatus number that has been acquired in Step S1310 in the data storage apparatus number 6410 of the RAID group performance information 640.

Subsequently, the performance information report program 525 stores the RAID group number 1242 that has been extracted by the configuration information acquisition program 521 in Step S1320 in the RAID group number 6421 of the RAID group performance information 640. Then, the performance information report program 525 stores the busy rate 1253 that has been extracted by the performance data acquisition program 523 in Step S1330 in the busy rate 6423 of the RAID group performance information 640.

Then, the performance information report program 525 stores the data volume number 1241 that has been extracted by the configuration information acquisition program 521 in Step S1320 in the data volume number 6431 of the RAID group performance information 640. Then, the performance information report program 525 stores the busy rate 1234 that has been extracted by the performance data acquisition program 523 in Step S1340 in the busy rate 6433 of the RAID group performance information 640.

Subsequently, the performance information report program 525 stores the measurement period that has been acquired in Step S1310 in the measurement period 6440 of the RAID group performance information 640.

Then, the performance information report program 525 selects the records in which the data volume number that has been acquired in Step S1310 coincides with the data volume number 6431 of the RAID group performance information 640 from the RAID group performance information 640. Then, the performance information report program 525 stores an asterisk "*" in the select flag 6450 of the selected record.

In the above manner, the performance information report program 525 updates the RAID group performance information 640.

Subsequently, the performance information report program 525 determines whether or not the configuration information acquisition program 521 has selected all of the records of the volume and RAID group mapping information 124 in Step S1315 (S1355).

When the performance information report program 525 determines that the configuration information acquisition program 521 has not selected all of the records, the processing returns to Step S1315. Then, the management computer 500 repeats the processes of Steps S1315 to S1350 with respect to the unselected records.

On the other hand, the performance information report program 525 determines that the configuration information acquisition program 521 has selected all of the records, the process of producing the RAID group performance information 640 is finished.

In Step S1315, the configuration information acquisition program 521 may select only the records in which the data volume number that has been acquired by the performance information report program 525 in Step S1310 coincides with the data volume number 1241 of the volume and RAID group mapping information 124 from the volume and RAID group mapping information 124. With the above structure, the management computer 500 is capable of storing only the information corresponding to the logical data volume that has been selected in the select field 734 of the external data storage port performance screen 730 in the RAID group performance information 640.

Upon producing the RAID group performance information 640, the performance information report program 525 produces the RAID group performance screen on the basis of the RAID group performance information 640. Then, the performance information report program 525 allows the produced RAID group performance screen to be displayed on the display 515.

Figure 26:
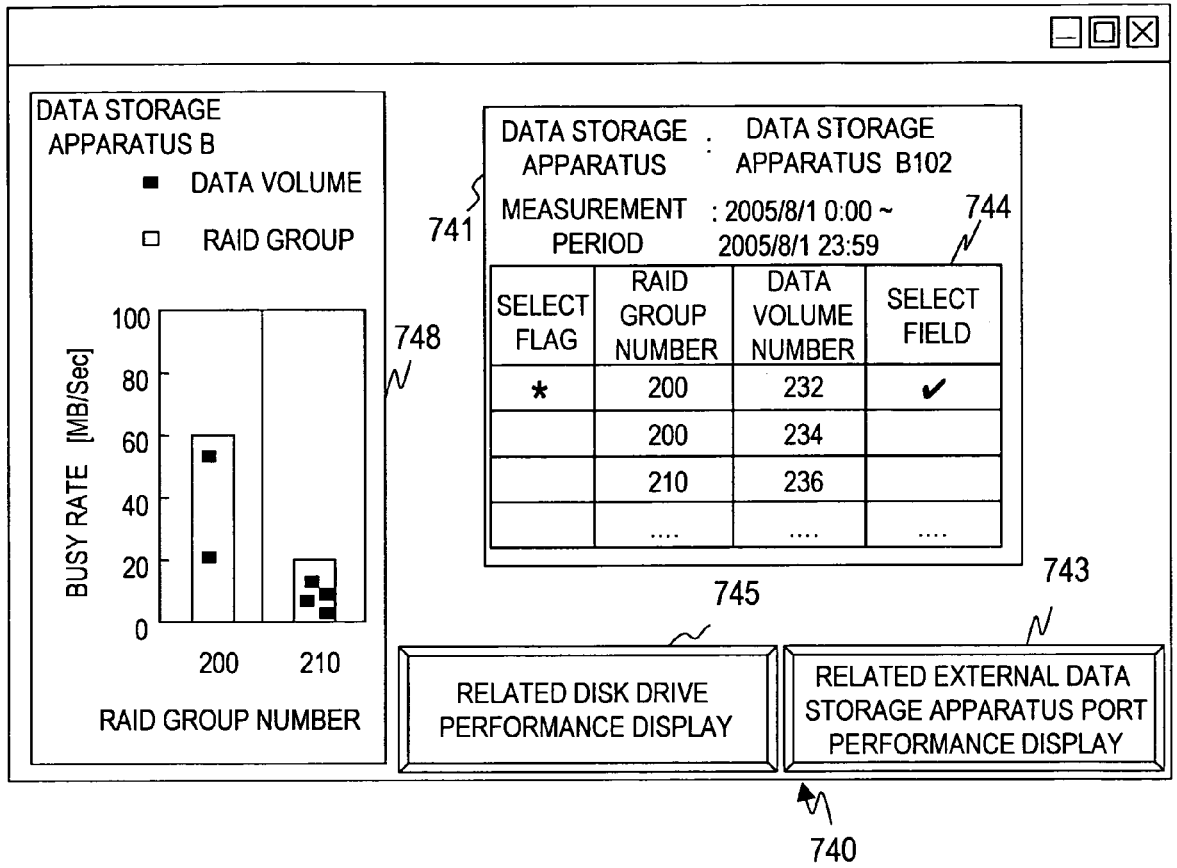
FIG. 26 is an explanatory diagram showing the RAID group performance screen that is displayed in the management computer according to the first embodiment.

FIG. 26 is an explanatory diagram showing the RAID group performance screen 740 that is displayed in the management computer 500 according to the first embodiment.

The RAID group performance screen 740 includes data volume select information 741, a performance graph 748, a related external data storage apparatus port performance display button 743, and a related disk performance display button 745.

The data volume select information 741 includes some or all of the RAID group performance information 640. Also, the data volume select information 741 includes a select field 744.

The data volume select information 741 shown in the figure includes the data storage apparatus numbers 6410, the measurement periods 6440, the select flags 6450, the RAID group numbers 6421, and the data volume numbers 6431 of the RAID group performance information 640.

The select field 744 indicates whether the data volume of the records is selected or not. In the RAID group performance screen 740 shown in the figure, the administrator selects the logical data volume 232 of the data storage apparatus B 102.

The performance graph 748 is produced on the basis of the RAID group performance information 640. The performance graph 748 shown in FIG. 26 is produced on the basis of the busy rates 6423 and 6433 of the RAID group performance information 640. As a result, the performance graph 748 shown in FIG. 26 exhibits the performance of the RAID group 200, etc., of the data storage apparatus B 102. In addition, the performance graph 748 shown in the figure exhibits the performance of the logical data volume 232, etc., which belong to the RAID group 200, etc.

In the performance graph 748, the graph related to the records in which "*" is stored in the select flag 6450 of the RAID group performance information 640 may be emphasized or flickered. With the above structure, the administrator is capable of readily grasping the performance related to the selected data volume from the performance graph 748.

The performance graph 748 is not limited to FIG. 26 but may be a graph of the different type such as a line graph. Also, the RAID group performance screen 740 may include a table indicative of the performance of the RAID group instead of the performance graph 748.

The administrator analyzes the RAID group performance screen 740, thereby making it possible to grasp the status of the RAID group 200, etc., of the data storage apparatus 101 to 103. According to the RAID group performance screen 740 shown in the figure, the administrator grasps that the two data volumes 232 and 234 are included in the RAID group 200. Accordingly, the administrator is capable of grasping that those two data volumes 232 and 234 are influenced by each other's IOs.

When the related external data storage apparatus port performance display button 743 is operated, the management computer 500 allows the external data storage port performance screen 730 (FIG. 23) to be displayed on the display 515.

When the related disk performance display button 745 is operated, the management computer 500 produces the disk performance information 650 which will be described with reference to FIG. 27 later. A process of producing the disk performance information 650 by the management computer 500 will be described with reference to FIG. 28 later.

Subsequently, the management computer 500 produces the disk performance screen, which will be described with reference to FIG. 29 later, on the basis of the produced disk performance information 650. Then, the management computer 500 allows the produced disk performance screen to be displayed on the display 515.

FIG. 27 is a structural diagram showing the disk performance information 650 of the management computer 500 according to the first embodiment.

The disk performance information 650 includes data storage apparatus numbers 6510, RAID group performance data 6520, disk drive performance data 6530, measurement periods 6540, and select flags 6550.

The data storage apparatus numbers 6510 are unique identifiers of the data storage apparatus 101 to 103.

The RAID group performance data 6520 includes the RAID group number 6521 and the busy rate 6523.

The RAID group numbers 6521 are unique identifiers of the RAID group 200, etc., of the data storage apparatus 101 to 103. The busy rate 6523 is a rate of the time of a busy state, which is in the RAID group 200, etc., in the measurement period.

The disk drive performance data 6530 includes disk drive numbers 6531 and busy rates 6533.

The disk drives 6531 are unique identifiers of the disk drive 161 to 168., which constitute the RAID group 200, etc. The busy rate 6533 is a rate of the time of a busy state, which is in the disk drive 161 to 168, in the measurement period.

The measurement periods 6540 are a period of time during which the busy rates 6523 and 6533 of the record have been measured. The select flag 6550 indicates whether the RAID group 200, etc., of the record have been selected by the administrator, or not.

Figure 28:
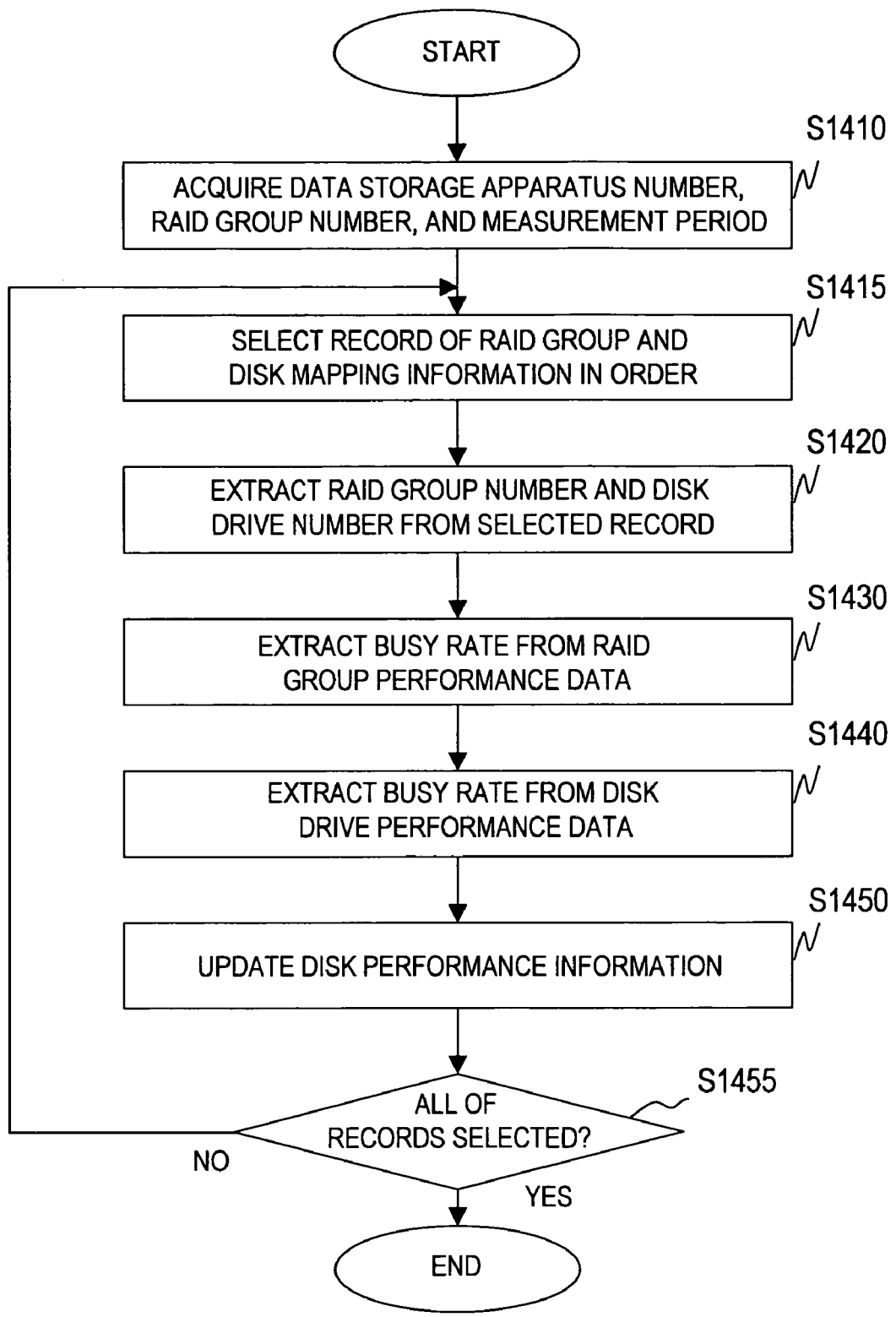
FIG. 28 is a flowchart showing a process of preparing the disk performance information of the management computer according to the first embodiment.

FIG. 28 is a flowchart showing a process of producing the disk performance information 650 of the management computer 500 according to the first embodiment.

When the related disk performance display button 745 of the RAID group performance screen 740 is operated, the management computer 500 starts a process of producing the disk performance information 650.

First, the performance information report program 525 of the management computer 500 acquires the information that is designated by the RAID group performance screen 740. More specifically, the performance information report program 525 acquires the data storage apparatus number and the measurement period from the RAID group performance screen 740. In addition, the performance information report program 525 acquires the RAID group number of the record that has been selected in the select field 734 of the RAID group performance screen 740 (S1410).

In this embodiment, the performance information report program 525 acquires "102" of the data storage apparatus number, "200" of the RAID group number, and "2005/8/1 0:00 to 2005/8/1 23:59" of the measurement period.

Subsequently, the configuration information acquisition program 521 of the management computer 500 specifies the data storage apparatus B 102 corresponding to "102" of the external data storage apparatus number that has been acquired by the performance information report program 525. Then, the configuration information acquisition program 521 selects all of the records of the RAID group and disk mapping information 126 of the specified data storage apparatus B 102 in order (S1415). Thereafter, the management computer 500 repeats the processes from Steps S1420 to S1450 with respect to the selected record.

The configuration information acquisition program 521 extracts the RAID group number 1261 and the disk drive number 1262 from the selected record (S1420).

Subsequently, the performance data acquisition program 523 of the management computer 500 specifies the data storage apparatus B 102 corresponding to "102" of the external data storage apparatus number which has been acquired by the performance information report program 525. Then, the performance data acquisition program 523 extracts information related to the performance of the RAID group 200, etc., from the RAID group performance data 125 (FIG. 10) of the specified data storage apparatus B 102.

In this embodiment, the performance data acquisition program 523 selects, from the RAID group performance data 125, all of the records in which the RAID group number 1261 that has been extracted by the configuration information acquisition program 521 coincides with the RAID group number 1252 of the RAID group performance data 125. Then, the performance data acquisition program 523 specifies, from the selected records, the records in which the measurement period that has been acquired by the performance information report program 525 coincides with the measurement period 1254 of the RAID group performance data 125.

Then, the performance data acquisition program 523 extracts the busy rate 1253 from the specified record (S1430).

Subsequently, the performance data acquisition program 523 extracts information related to the performance of the disk drive from the disk drive performance data 127 (FIG. 11) of the data storage apparatus B 102.

In this embodiment, the performance data acquisition program 523 selects, from the disk drive performance data 127, all of the records in which disk drive number 1262 that has been extracted by the configuration information acquisition program 521 in Step S1420 coincides with the disk drive number 1272 of the disk drive performance data 127. Then, the performance data acquisition program 523 specifies, from the selected records, the records in which the measurement period that has been acquired by the performance information report program 525 coincides with the measurement period 1274 of the disk drive performance data 127.

Then, the performance data acquisition program 523 extracts the busy rate 1273 from the specified record (S1440).

Then, the performance information report program 525 updates the disk performance information 650 (S1450).

More specifically, the performance information report program 525 stores the data storage apparatus number that has been acquired in Step S1410 in the data storage apparatus number 6510 of the disk performance information 650.

Subsequently, the performance information report program 525 stores the RAID group number 1261 that has been extracted by the configuration information acquisition program 521 in Step S1420 in the RAID group number 6521 of the disk performance information 650. Then, the performance information report program 525 stores the busy rate 1253 that has been extracted by the performance data acquisition program 523 in Step S1430 in the busy rate 6523 of the disk performance information 650.

Subsequently, the performance information report program 525 stores the disk drive number 1262 that has been extracted by the configuration information acquisition program 521 in Step S1420 in the disk drive number 6531 of the disk performance information 650. Thereafter, the performance information report program 525 stores the busy rate 1273 that has been extracted by the performance data acquisition program 523 in Step S1440 in the busy rate 6533 of the disk performance information 650.

Then, the performance information report program 525 stores the measurement period that has been acquired in Step S1410 in the measurement period 6540 of the disk performance information 650.

Subsequently, the performance information report program 525 selects, from the disk performance information 650, the records in which the RAID group number that has been acquired in Step S1410 coincides with the RAID group number 6521 of the disk performance information 650. Then, the performance information report program 525 stores an asterisk "*" in the select flag 6550 of the selected records.

In the above manner, the performance information report program 525 updates the disk performance information 650.

Subsequently, the performance information report program 525 determines whether or not the configuration information acquisition program 521 has selected all of the records of the RAID group and disk mapping information 126 in Step S1415 (S1455).

When the performance information report program 525 determines that the configuration information acquisition program 521 has not selected all of the records, the processing returns to Step S1415. Then, the management computer 500 repeats the processes from Steps S1415 to S1450 are repeated with respect to the unselected records.

On the other hand, the performance information report program 525 determines that the configuration information acquisition program 521 has selected all of the records, the process of producing the disk performance information 650 is finished.

In Step S1415, the configuration information acquisition program 521 may select only the records in which the RAID group number that has been acquired by the performance information report program 525 in Step S1410 coincides with the RAID group number 1261 of the RAID group and disk mapping information 126 from the RAID group and disk mapping information 126. With the above structure, the management computer 500 is capable of storing, in the disk performance information 650, only the information corresponding to the RAID group to which the logical data volume, which has been selected in the select field 744 of the RAID group performance screen 740, belongs.

When producing the disk performance information 650, the performance information report program 525 produces the disk performance screen on the basis of the disk performance information 650. Then, the performance information report program 525 allows the produced disk performance screen to be displayed on the display 515.

Figure 29:
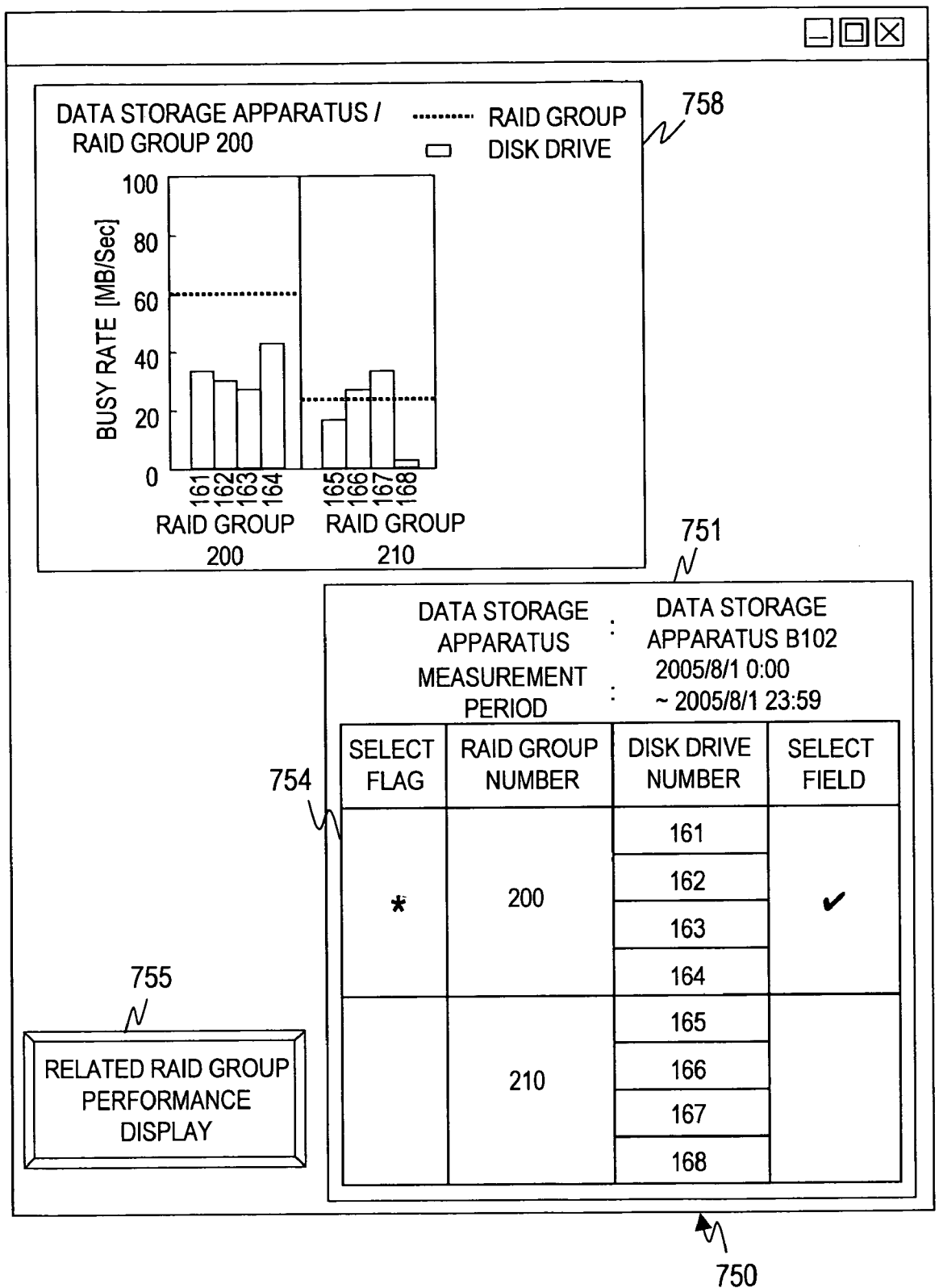
FIG. 29 is an explanatory diagram showing a disk performance screen that is displayed in the management computer according to the first embodiment.

FIG. 29 is an explanatory diagram showing a disk performance screen 750 that is displayed in the management computer 500 according to the first embodiment.

The disk performance screen 750 includes RAID group select information 751, a performance graph 758, and a related RAID group performance display button 755.

The RAID group select information 751 includes some or all of the disk performance information 650. Also, the RAID group select information 751 includes a select field 754.

The RAID group select information 751 shown in FIG. 29 includes a data storage apparatus number 6510, a measurement period 6540, a select flag 6550, RAID group numbers 6521, and disk drive numbers 6531 of the disk performance information 650.

The select field 754 indicates whether the RAID group 200, etc., of the record are selected or not. In the disk performance screen 750 shown in the figure, the administrator selects the RAID group 200 of the data storage apparatus B 102.

The performance graph 758 is produced on the basis of the disk performance information 650. The performance graph 758 in FIG. 29 is produced on the basis of the busy rates 6523 and 6533 of the disk performance information 650. With this structure, the performance graph 758 shown in FIG. 29 exhibits the performance of the RAID group 200, etc., of the data storage apparatus B 102. In addition, the performance graph 758 shown in FIG. 29 exhibits the performance of the RAID group 200, etc., of the data storage apparatus B 102. In addition, the performance graph 758 shown in FIG. 29 exhibits the performance of the disk drive that constitutes the RAID group 200, etc.

In the performance graph 758, the graph related to the records in which "*", is stored in the select flag 6550 of the disk performance information 650 may be emphasized or flickered. With the above structure, the administrator is capable of readily grasping the performance related to the selected RAID group from the performance graph 758.

The performance graph 758 is not limited to FIG. 29 but may be a graph of the different type such as a line graph. Also, the disk performance screen 750 may include a table indicative of the performance of the disk drive instead of the performance graph 758.

When the related RAID group performance display button 755 is operated, the management computer 500 allows the RAID group performance screen 740 (FIG. 26) to be displayed on the display 515.

As described above, the management computer 500 displays the performance of the structural site on the transmission path while tracking the transmission path of data.

More specifically, the management computer 500 tracks the transmission of data which requires write of the virtualized data volume of the data storage apparatus A 101 by the host computer A 301. Then, the management computer 500 displays the performances of the FC port 150A of the data storage apparatus A 101 that exists on the transmission path, the virtualized data volume 132 of the data storage apparatus A 101, the FC port 150E of the data storage apparatus A 101, the logical data volume 232 of the data storage apparatus B 102, and the RAID group 200 of the data storage apparatus B 102.

Second Embodiment

In a computer system according to a second embodiment, there is the competition of an access to the FC port 1501 of the data storage apparatus 102B.

The configuration and processing of the computer system according to the second embodiment are identical with those of the computer system according to the first embodiment. Therefore, the description of the identical configuration and the identical processing will be omitted.

Figure 30:
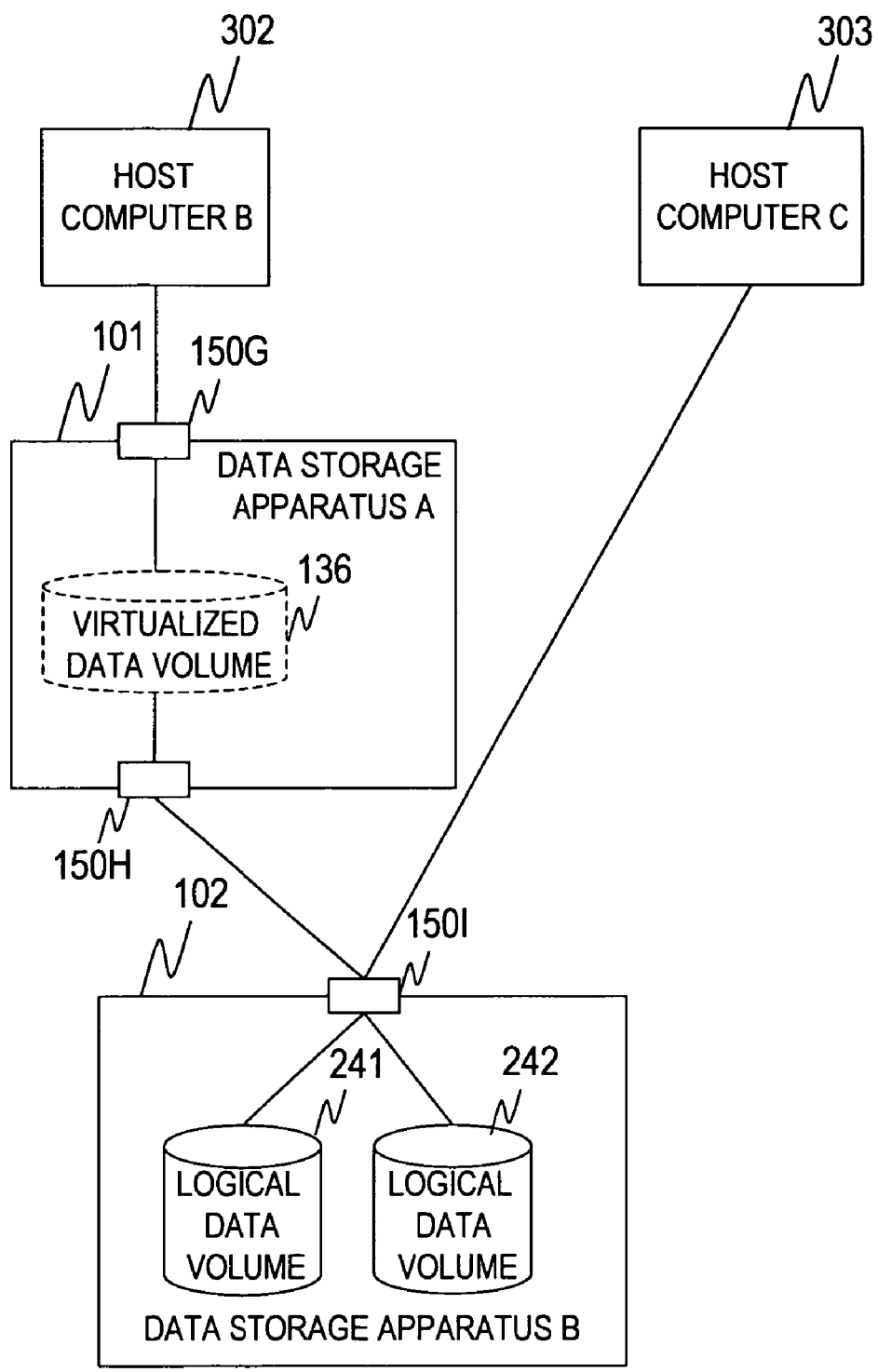
FIG. 30 is an explanatory diagram showing a path of the computer system according to a second embodiment.

FIG. 30 is an explanatory diagram showing a path of a computer system according to the second embodiment.

In FIG. 30, a physical path of the computer system is omitted, and only the logical path of the computer system is shown.

A virtualized data volume 136 of the data storage apparatus A 101 is assigned to the data storage apparatus B 302. For that reason, a path that is routed through an FC port 150G of the data storage apparatus A 101 is allocated between the host computer B 302 and the virtualized data volume 136 of the data storage apparatus A 101. That is, data that is required to be written in the virtualized data volume 136 of the data storage apparatus A 101 by the host computer B 302 is transmitted to the virtualized data volume 136 of the data storage apparatus A 101 from the host computer B 302 with the path as a transmission path.

The virtualized data volume 136 is a virtualized data volume, and cannot store data therein. Therefore, the data storage apparatus A 101 supplies the logical data volume 241 of the data storage apparatus B 102 to the host computer B 302 as its virtualized data volume 136.

Also, a path that is routed through the FC port 150H of the data storage apparatus A 101 and the FC port 150I of the data storage apparatus B 102 is allocated between the virtualized data volume 136 of the data storage apparatus A 101 and the logical data volume 241 of the data storage apparatus B 102. That is, data that is required to be written in the virtualized data volume 136 of the data storage apparatus A 101 by the host computer B 302 is transmitted to the logical data volume 241 of the data storage apparatus B 102 from the virtualized data volume 136 of the data storage apparatus A 101 with the path as the transmission path.

Also, the logical data volume 242 of the data storage apparatus B 102 is assigned to the host computer C 303. For that reason, a path that is routed through the FC port 150I of the data storage apparatus B 102 is allocated between the host computer C 303 and the logical data volume 242 of the data storage apparatus B 102. That is, data that is required to be written in the logical data volume 242 of the data storage apparatus B 102 by the host computer C 303 is transmitted to the logical data volume 242 of the data storage apparatus B 102 from the host computer C 303 with the path as a transmission path.

That is, in the FC port 1501 of the data storage apparatus B 102, the IO of the data storage apparatus A 101 and the IO of the host computer C 303 compete with each other. The administrator is capable of grasping the competition of 10 from the display screen of the management computer 500.

More specifically, the management computer 500 transits the target port performance screen 710, the external port performance screen 720, the external data storage port performance screen 730, the RAID group performance screen 740, and the disk performance screen 750 in the stated order as in the first embodiment. In this situation, the administrator grasps that there occurs no competition of 10 while referring to the target port performance screen 710 and the external port performance screen 720.

Subsequently, the administrator refers to the external data storage port performance screen 730.

Figure 31:
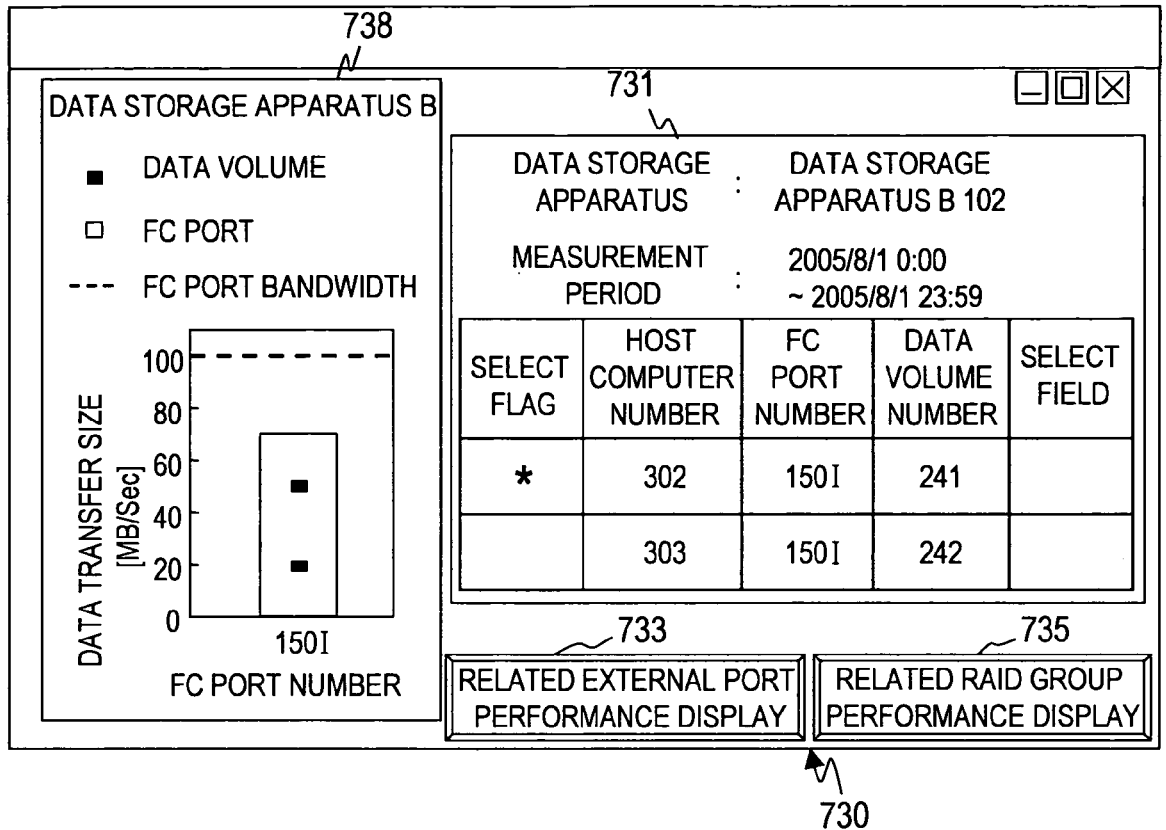
FIG. 31 is an explanatory diagram showing an external data storage port performance screen that is displayed in the management computer according to the second embodiment.

FIG. 31 is an explanatory diagram showing the external data storage port performance screen 730 that is displayed on the management computer 500 according to the second embodiment.

The configuration of the external data storage port performance screen 730 are identical with that of the external data storage port performance screen (FIG. 23) of the first embodiment. The same configurations are denoted by identical numerals, and their description will be omitted.

The administrator is capable of grasping the status of the FC port 150I while referring to the external data storage port performance screen 730. More specifically, in the FC port 150I, the administrator grasps that the IO to the logical data volume 241 competes against the IO to the logical data volume 242. Accordingly, the administrator is capable of predicting that an access performance to the virtualized data volume 136 of the data storage apparatus A 101 is deteriorated.

Third Embodiment

In a computer system according to a third embodiment, the data storage apparatus C 103 stores replication data of the data storage apparatus A 101 and the data storage apparatus B 102.

The configuration and processing of the computer system according to the third embodiment are identical with those of the computer system according to the first embodiment. Therefore, the description of the identical configuration and the identical processing will be omitted.

Figure 32:
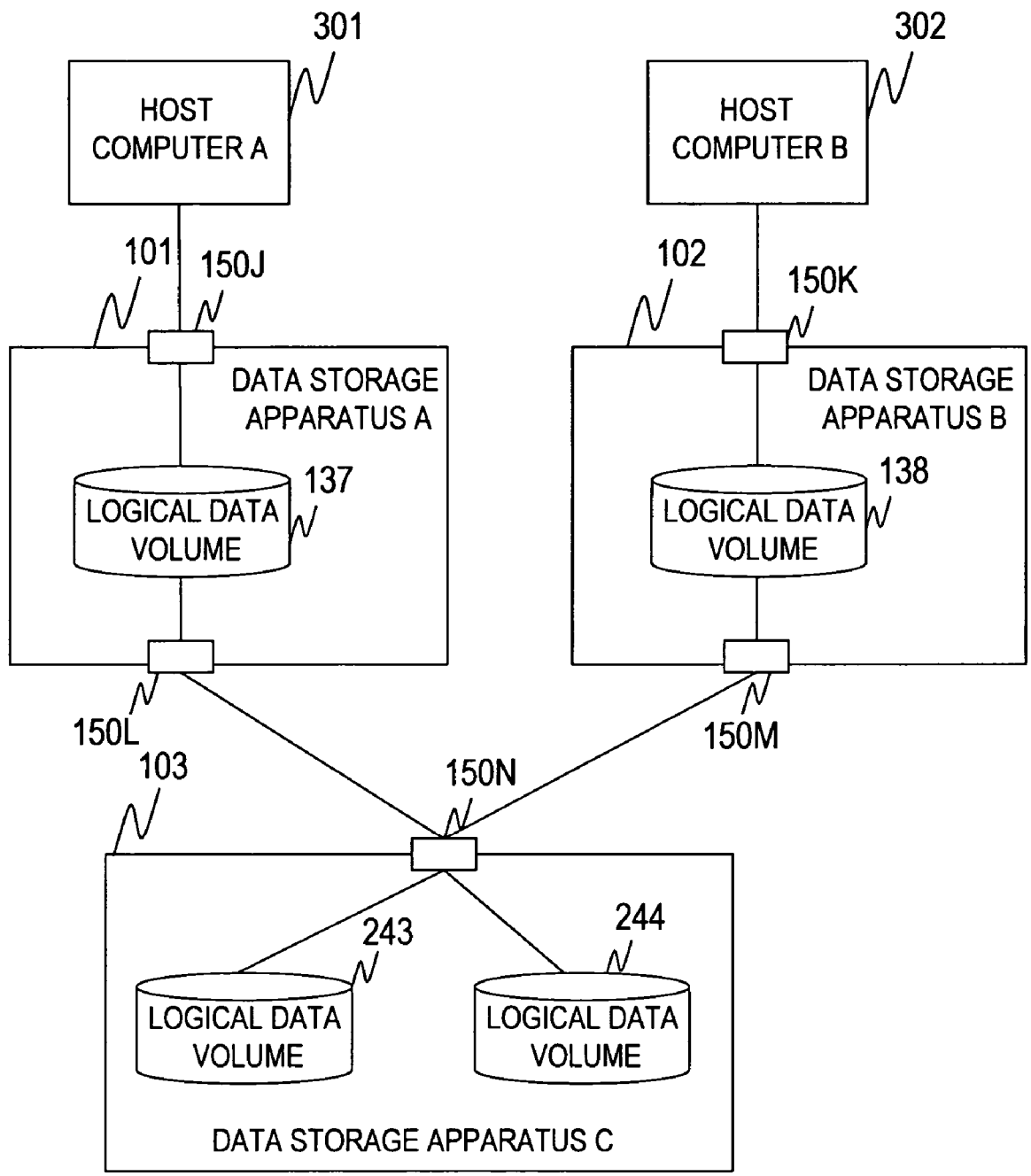
FIG. 32 is an explanatory diagram showing a path of a computer system according to a third embodiment.

FIG. 32 is an explanatory diagram showing a path of a computer system according to the third embodiment.

In FIG. 32, a physical path of the computer system is omitted, and only the logical path of the computer system is shown.

A logical data volume 137 of the data storage apparatus A 101 is assigned to the host computer A 301. For that reason, a path that is routed through an FC port 150J of the data storage apparatus A 101 is allocated between the host computer A 301 and the logical data volume 137 of the data storage apparatus A 101. That is, data that is required to be written in the logical data volume 137 of the data storage apparatus A 101 by the host computer A 301 is transmitted to the logical data volume 137 of the data storage apparatus A 101 from the host computer A 301 with the path as a transmission path.

Also, a logical data volume 138 of the data storage apparatus B 102 is assigned to the host computer B 302. For that reason, a path that is routed through an FC port 150K of the data storage apparatus B 102 is allocated between the host computer B 302 and the logical data volume 138 of the data storage apparatus B 102. That is, data that is required to be written in the logical data volume 138 of the data storage apparatus B 102 by the host computer B 302 is transmitted to the logical data volume 138 of the data storage apparatus B 102 from the host computer B 302 with the path as a transmission path.

The data storage apparatus A 101 copies the data of the logical data volume 137 to the logical data volume 243 of the data storage apparatus C 103. For that reason, a path that is routed through the FC port 150L of the data storage apparatus A 101 and the FC port 150N of the data storage apparatus C 103 is allocated between the logical data volume 137 of the data storage apparatus A 101 and the logical data volume 243 of the data storage apparatus C 103. That is, data that is required to be written in the logical data volume 137 of the data storage apparatus A 101 by the host computer A 301 is transmitted to the logical data volume 243 of the data storage apparatus C 103 from the logical data volume 137 of the data storage apparatus A 101 with the path as the transmission path.

Likewise, the data storage apparatus B 102 copies the data of the logical data volume 138 to the logical data volume 244 of the data storage apparatus C 103. For that reason, a path that is routed through the FC port 150M of the data storage apparatus B 102 and the FC port 150N of the data storage apparatus C 103 is allocated between the logical data volume 138 of the data storage apparatus B 102 and the logical data volume 244 of the data storage apparatus C 103. That is, data that is required to be written in the logical data volume 138 of the data storage apparatus B 102 by the host computer B 302 is transmitted to the logical data volume 244 of the data storage apparatus C 103 from the logical data volume 138 of the data storage apparatus B 102 with the path as a transmission path.

As a result, in the second embodiment, "real" is stored in the real/virtual flag 1224 of the data volume configuration table 122 (FIG. 5).

The management computer 500 transits the target port performance screen 710, the external port performance screen 720, the external data storage port performance screen 730, the RAID group performance screen 740, and the disk performance screen 750 in the stated order as in the first embodiment. In this situation, the administrator grasps that there occurs no competition of IO while referring to the target port performance screen 710 and the external port performance screen 720.

The administrator refers to the external data storage port performance screen 730. As a result, the administrator is capable of grasping that the IO to the logical data volume 243 competes against the IO to the logical data volume 244 in the FC port 150N of the data storage apparatus C 103.

Fourth Embodiment

In a computer system according to a fourth embodiment, the data storage apparatus C 103 has a replication data volume.

The configuration and processing of the computer system according to the fourth embodiment are identical with those of the computer system according to the first embodiment. Therefore, the description of the identical configuration and the identical processing will be omitted.

Figure 33:
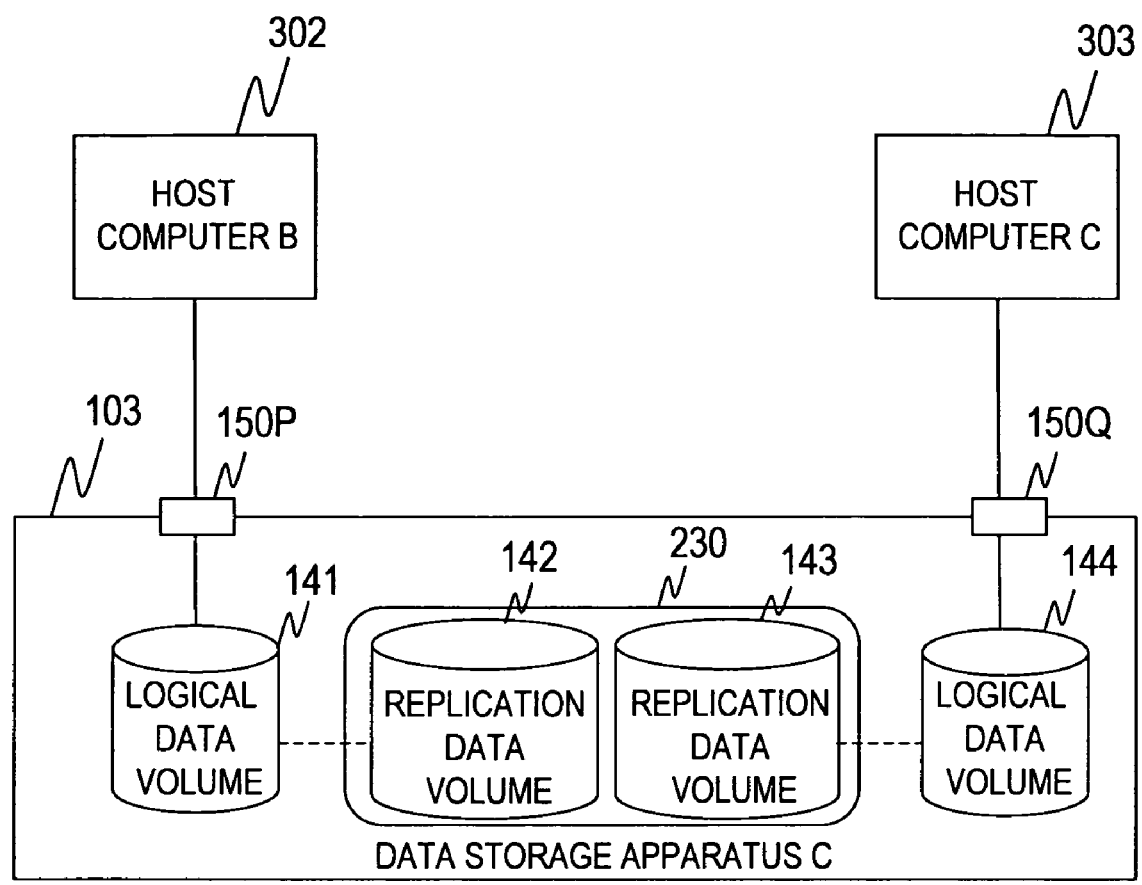
FIG. 33 is an explanatory diagram showing a path of a computer system according to a fourth embodiment.

FIG. 33 is an explanatory diagram showing a path of a computer system according to the fourth embodiment.

In FIG. 33, a physical path of the computer system is omitted, and only the logical path of the computer system is shown.

A logical data volume 141 of the data storage apparatus C 103 is assigned to the host computer B 302. For that reason, a path that is routed through an FC port 150P of the data storage apparatus C 103 is allocated between the host computer B 302 and the logical data volume 141 of the data storage apparatus C 103. That is, data that is required to be written in the logical data volume 141 of the data storage apparatus C 103 by the host computer B 302 is transmitted to the logical data volume 141 of the data storage apparatus C 103 from the host computer B 302 with the path as a transmission path.

A logical data volume 144 of the data storage apparatus C 103 is assigned to the host computer C 303. For that reason, a path that is routed through an FC port 150Q of the data storage apparatus C 103 is allocated between the host computer C 303 and the logical data volume 144 of the data storage apparatus C 103. That is, data that is required to be written in the logical data volume 144 of the data storage apparatus C 103 by the host computer C 303 is transmitted to the logical data volume 144 of the data storage apparatus C 103 from the host computer C 303 with the path as a transmission path.

The data storage apparatus C 103 copies data of the logical data volume 141 to the replication data volume 142 by means of a data copying function. For that reason, a path is allocated between the logical data volume 141 of the data storage apparatus C 103 and the replication data volume 142 of the data storage apparatus C 103. That is, data that is required to be written in the logical data volume 141 of the data storage apparatus C 103 by the host computer B 302 is transmitted to the replication data volume 142 of the data storage apparatus C 103 from the logical data volume 141 of the data storage apparatus C 103 with the path as a transmission path.

Likewise, the data storage apparatus C 103 copies data of the logical data volume 144 to the replication data volume 143 by means of the data copying function. For that reason, a path is allocated between the logical data volume 144 of the data storage apparatus C 103 and the replication data volume 143 of the data storage apparatus C 103. That is, data that is required to be written in the logical data volume 144 of the data storage apparatus C 103 by the host computer C 303 is transmitted to the replication data volume 143 of the data storage apparatus C 103 from the logical data volume 144 of the data storage apparatus C 103 with the path as a transmission path.

The replication data volumes 142 and 143 belong to the RAID group 230.

The data storage apparatus C103 according to the fourth embodiment stores the replication data volume configuration table 128 in a control memory 120 in order to manage the replication data volumes 142 and 143. Other structures of the data storage apparatus 101 to 103, in the fourth embodiment are identical with the data storage apparatuses (FIG. 2) in the first embodiment, and therefore their description will be omitted.

FIG. 34 is a structural diagram showing the replication data volume configuration table 128 according to the fourth embodiment.

The replication data volume configuration table 128 includes FC port numbers 1281, data volume numbers 1282, host computer numbers 1283, and replication data volume numbers 1284.

The FC port numbers 1281 are unique identifiers of the FC port 150 of the data storage apparatus C 103. The data volume numbers 1282 are unique identifiers of the logical data volumes that are accessed through the FC port 150. The host computer numbers 1283 are unique identifiers of the host computers, 301 etc., which access the logical data volume. The replication data volume numbers 1284 are unique identifiers of the logical data volumes (replication data volumes) to which the data of the logical data volumes are copied.

The management computer 500 produces an FC port performance screen 760 on the basis of the replication data volume configuration table 128.

Figure 35:
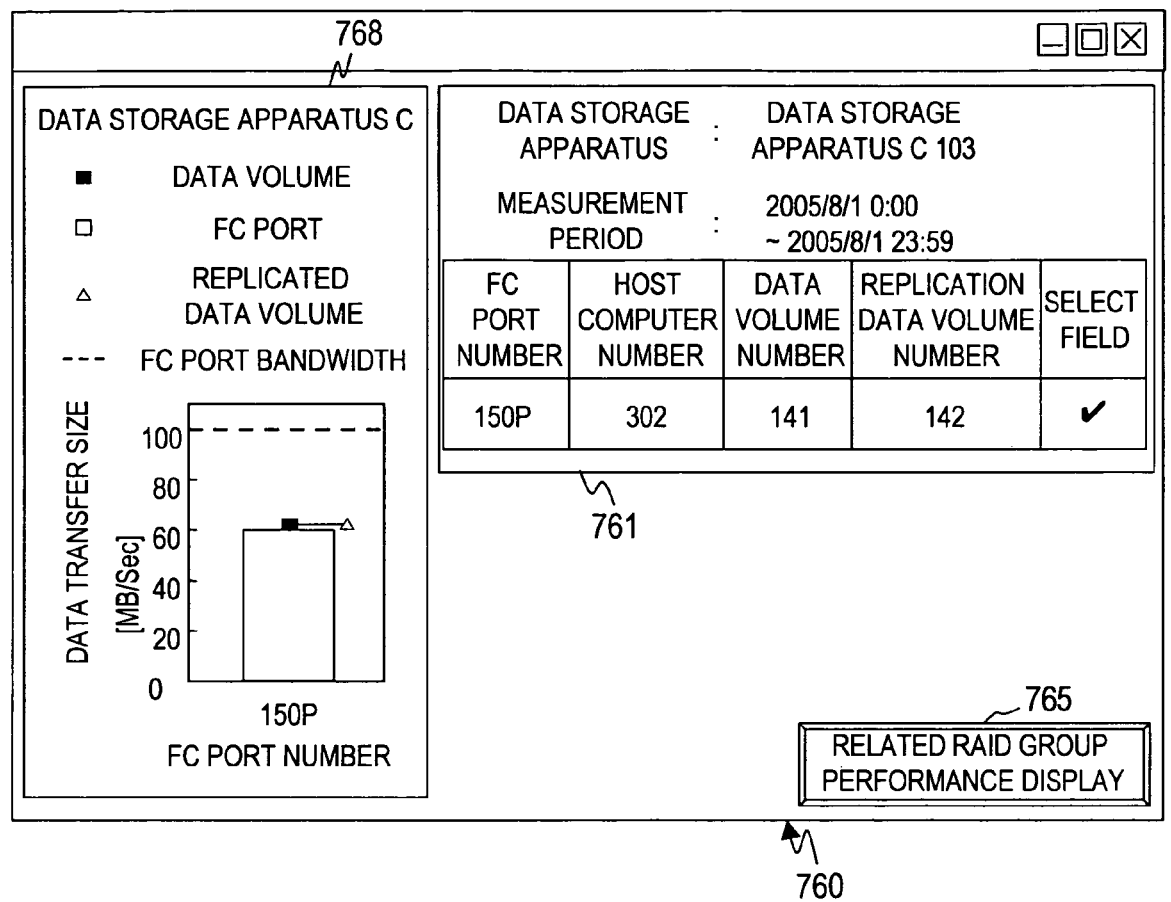
FIG. 35 is an explanatory diagram showing an FC port performance screen that is displayed in the management computer according to the fourth embodiment.

FIG. 35 is an explanatory diagram showing the FC port performance screen 760 that is displayed in the management computer 500 according to the fourth embodiment.

The FC port performance screen 760 includes data volume select information 761, a performance graph 768, and a related RAID group performance display button 765.

The data volume select information 761 includes some or all of the replication data volume configuration table 128. Also, the data volume select information 761 includes a select field.

The select field indicates whether the replication data volume of the record has been selected, or not. In the FC port performance screen 760 shown in FIG. 35, the administrator selects the replication data volume 142.

The performance graph 768 exhibits the performance of the FC port 150P of the data storage apparatus C 103. In addition, the performance graph 768 exhibits the performances of the logical data volume 141 and the replication data volume 142 of the data storage apparatus C 103.

The performance graph 768 is not limited to FIG. 35 but may be a graph of the different type such as a line graph.

The administrator is capable of grasping the status of the FC port 150P of the data storage apparatus C 103 while referring to the FC port performance screen 760. According to the FC port performance screen 760 shown in the figure, the administrator grasps that there occurs no competition of IO in the FC port 150P.

When the related RAID group performance display button 765 is operated, the management computer 500 produces the replication data volume performance screen that will be described with reference to FIG. 36 later. Then, the management computer 500 allows the produced replication data volume performance screen to be displayed on the display 515.

Figure 36:
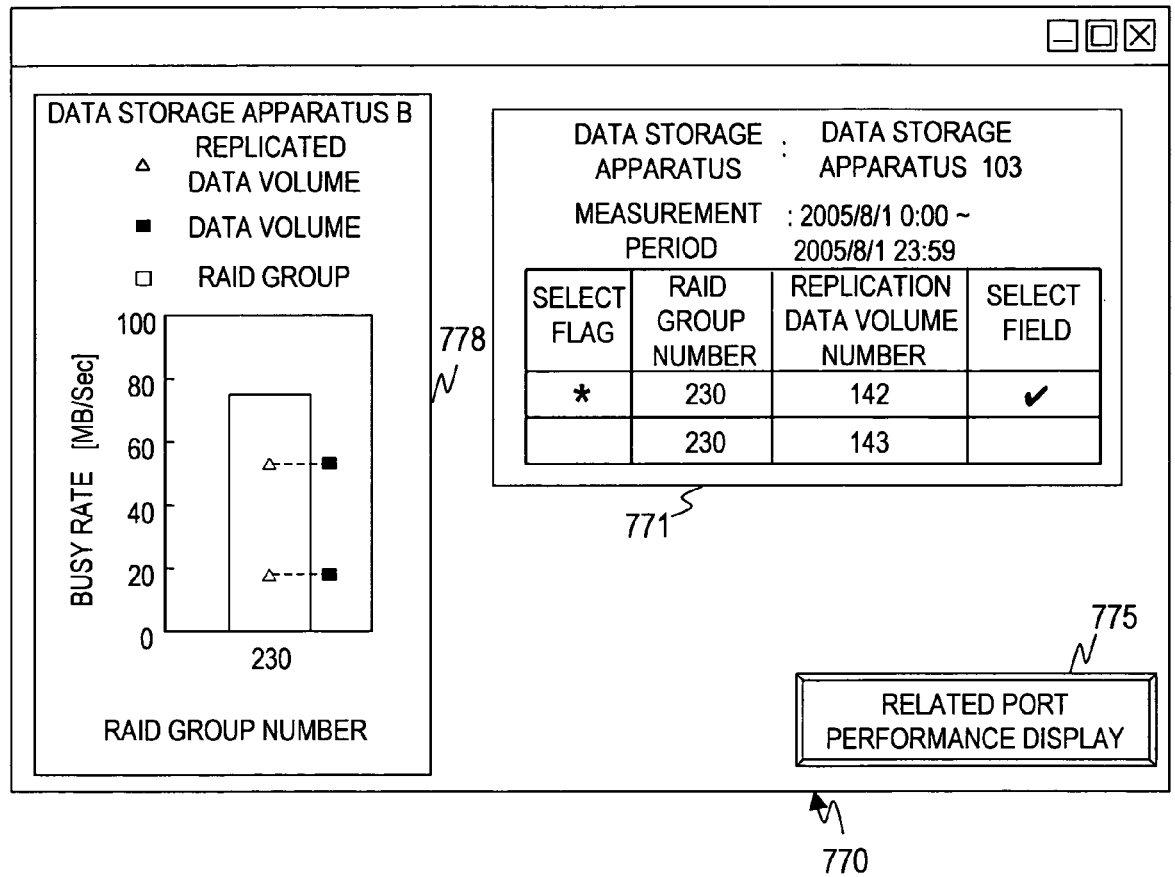
FIG. 36 is an explanatory diagram showing a replication data volume performance screen that is displayed in the management computer according to the fourth embodiment.

FIG. 36 is an explanatory diagram showing a replication data volume performance screen 770 that is displayed in the management computer 500 according to the fourth embodiment.

The replication data volume performance screen 770 includes replication data volume select information 771, a performance graph 778, and a related port performance display button 775.

The data volume select information 771 includes information related to a correspondence of the replication data volume with the RAID group, and the select field.

The select field indicates whether the replication data volume has been selected or not. In the replication data volume performance screen 770 shown in FIG. 36, the administrator selects the replication data volume 142.

The performance graph 778 indicates the performance of the RAID group 230 of the data storage apparatus C 103. In addition, the performance graph 778 indicates the performance of the replication data volume 142, etc., which belong to the RAID group 230. The performance graph 778 is not limited to FIG. 35 but may be a graph of the different type such as a line graph.

The administrator is capable of grasping the status of the replication data volume 142 of the data storage apparatus C 103 while referring to the replication data volume performance screen 770. According to the replication data volume performance screen 770 shown in the figure, the administrator is capable of grasping that those two replication data volumes 142 and 143 belong to the same RAID groups 230.

When the related port performance display button 775 is operated, the management computer 500 allows the FC port performance screen 760 (FIG. 35) to be displayed on the display 515.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a first data storage apparatus;
   a second data storage apparatus;
   a host computer that is connected to first data storage apparatus via a network; and a management computer configured to access the first data storage apparatus, the second data storage apparatus, and the host computer, wherein the first data storage apparatus includes structural elements: a first interface that has a first port and is connected to the network; a first processor that is connected to the first interface; a first memory that is connected to the first processor; and a first disk drive, first data storage apparatus provides a virtualized data volume into which data required to be written by the host computer via sending a write request, wherein the second data storage apparatus includes structural elements: a second interface that has a second port and is connected to the network; a second processor that is connected to the second interface; a second memory that is connected to the second processor; and a second disk drive that is configured with a logical data volume thereon to execute therein the write request addressed to the virtualized data volume from the host computer, wherein a first transmission path is routed through the first port and is allocated between the host computer and the virtualized data volume, and a second transmission path is routed through the first port and the second port and is allocated between the virtualized data volume and the logical data volume, wherein upon receiving the write request addressed to the virtualized data volume, the first data storage apparatus transfers data required to be written in the virtualized data volume through the first and second transmission paths to the second data storage apparatus, and without being written in the virtualized data volume, wherein the management computer includes structural elements: a third interface that is connected externally; a third processor that is connected to the third interface; and a third memory that is connected to the third processor, wherein the second data storage apparatus configures a RAID group with a plurality of said second disk drives, and provides the RAID group including the logical data volume, wherein the logical data volume is configured to store data which is required to be written in the virtualized data volume of the first data storage apparatus, wherein the first memory stores a virtualized data volume configuration table, which indicates a logical connection relationship of the structural elements of the first data storage apparatus therein, wherein the second memory stores a logical data volume configuration table, which indicates a logical connection relationship of the structural elements of the second data storage apparatus therein, and wherein the third processor acquires at least one of the virtualized data volume configuration table that is stored in the first memory and the logical data volume configuration table that is stored in the second memory, wherein the third processor specifies the virtualized data volume, the logical data volume, the second disk drive, at least one of the ports of the first and second interfaces, and the RAID group, which are linked into a transmission path of the data required to be written into the virtualized data volume by the host computer, from the structural elements of the first data storage apparatus and the second data storage apparatus on the basis of at least one of the acquired virtualized data volume configuration table and the acquired logical data volume configuration table, wherein the third processor acquires performance data of the specified structural elements, and wherein the third processor outputs the acquired performance data.

2. The computer system according to claim 1, wherein the virtualized data volume configuration table includes a connection relationship between the port of the first interface of the first data storage apparatus and the port of the second interface of the second data storage apparatus, and a correspondence of the virtualized data volume and the logical data volume.

3. The computer system according to claim 1, wherein the first memory stores first performance history information which indicates a history of performance data of the structural elements of the first data storage apparatus therein, wherein the second memory stores second performance history information which indicates a history of performance data of the structural elements of the second data storage apparatus therein, wherein the third processor acquires at least one of the first performance history information that is stored in the first memory and the second performance history information that is stored in the second memory, and wherein the third processor acquires the performance data of the specified structural elements from at least one of the acquired first performance history information and the acquired second performance history information.

4. The computer system according to claim 1, wherein the third processor acquires the connection relationship between the port of the first interface of the first data storage apparatus and the port of the second interface of the second data storage apparatus, and the correspondence of the virtualized data volume and the logical data volume from the acquired virtualized data volume configuration table, and wherein the third processor outputs the acquired connection relationship between the port of the first interface of the first data storage apparatus and the port of the second interface of the second data storage apparatus, and the acquired correspondence of the virtualized data volume and the logical data volume together with the performance data.

5. The computer system according to claim 1, wherein when the first data storage apparatus receives the write request addressed to the virtualized data volume from the host computer, the first data storage apparatus forwards the write request to the second processor of the second data storage apparatus to write the data in the logical data volume without executing the write request in the virtualized data volume.

6. The computer system according to claim 1, wherein the first data storage apparatus configures another RAID group with a plurality of the second disk drives, and provides the another RAID group including at least one third logical data volume, wherein the third logical data volume is configured to store data which, is required to be written by the host computer, wherein the third processor acquires the virtualized data volume configuration table that is stored in the first memory, and wherein the third processor specifies the virtualized data volume, the third logical data volume, the second disk drive, at least one of the ports of the first and second interfaces, and the RAID group, which are linked into the transmission path of the data required to be written in the third data volume by the host computer, from the structural elements of the first data storage apparatus on the basis of the acquired virtualized data volume configuration table.

7. The computer system according to claim 1,
wherein the first processor of the first data storage apparatus configures another RAID group with a plurality of the second disk drives, and provides the another RAID group to the host computer as the virtualized data volume,
wherein the first processor of the first data storage apparatus copies the data that is stored in the virtualized data volume into the logical data volume of the second data storage apparatus, and
wherein the third processor specifies the virtualized data volume, the logical data volume, the first disk drive, the second disk drive, at least one of the ports of the first and second interfaces, the another RAID group, and the RAID group, which exist on a transmission path of the copied data that is transmitted to the second data storage apparatus from the first data storage apparatus, from the structural elements of the first data storage apparatus and the second data storage apparatus on the basis of at least one of the acquired virtualized data volume configuration table and the acquired logical data volume configuration table.

8. A management computer configured to access a first data storage apparatus, a second data storage apparatus, a host computer that is connected to the first data storage apparatus via a network,
the first data storage apparatus including structural elements: a first disk drive, a first interface having a first port, a first memory stored with a virtualized data volume configuration table which indicates a connection relationship of structural elements of the at least one first data storage apparatus, a virtualized data volume into which data required to be written by one of the at least one host computer via sending a write request,
a first transmission path is routed through the first port and is allocated between the host computer and the virtualized data volume, and a second transmission path is routed through the first port and the second port and is allocated between the virtualized data volume and a logical data volume,
upon receiving the write request addressed to the virtualized data volume, the first data storage apparatus transfers data required to be written in the virtualized data volume through the first and second transmission paths to the second data storage apparatus, and without being written in the virtualized data volume,
the second data storage apparatus including structural elements: a plurality of second disk drives at least one of which stores data which is required to be written by the at least one host computer, and a second interface having a second port, a second memory stored with a logical data volume configuration table which indicates a connection relationship of the structural elements of the at least one second data storage apparatus, a RAID group configured by the second disk drives, and the logical data volume configured on said one of the second disk drives to execute therein the write request addressed to the virtualized data volume of the first data storage apparatus from the host computer, and
wherein the management computer includes structural elements: a third interface that is connected externally; a third processor that is connected to the third interface; and a third memory that is connected to the third processor,
the third processor acquires at least one of the virtualized data volume configuration table that is stored in the first data storage apparatus and the logical data volume configuration table that is stored in the second data storage;
the third processor specifies the virtualized data volume, the logical data volume, the second disk drive, at least one of the ports of the first and second interfaces, and the RAID group, which are linked into a transmission path of the data required to be written into said at least one virtualized data volume by the host computer, from the structural elements of the first data storage apparatus and the second data storage apparatus on the basis of at least one of the virtualized data volume configuration table and the logical data volume configuration table;
the third processor acquires performance data of the specified structural elements; and
the third processor outputs the acquired performance data.

9. The management computer according to claim 8, wherein the virtualized data volume configuration table includes a connection relationship between the port of the first interface of first data storage apparatus and the port of the second interface of the second data storage apparatus, and a correspondence of the virtualized data volume and the logical data volume.

10. The management computer according to claim 8,
wherein the at least one first data storage apparatus stores first performance history information which indicates a history of performance data of the structural elements of said one of the at least one first data storage apparatus therein,
wherein the at least one second data storage apparatus stores second performance history information which indicates a history of performance data of the structural elements of said one of the at least one second data storage apparatus therein,
wherein the third processor acquires at least one of the first performance history information that is stored in the at least one first data storage apparatus and the second performance history information that is stored in the at least one second data storage apparatus, and
wherein the third processor acquires the performance data of the specified structural elements from at least one of the acquired first performance history information and the acquired second performance history information.

11. The management computer according to claim 8,
wherein the third processor acquires the connection relationship between the port of the first interface of the first data storage apparatus and the port of the second interface of the second data storage apparatus, and the correspondence of the virtualized data volume and the logical data volume from the acquired virtualized data volume configuration table, and
wherein the third processor outputs the acquired connection relationship between the port of the first interface of the first data storage apparatus and the port of the second interface of the second data storage apparatus, and the acquired correspondence of the virtualized data volume and the logical data volume together with the performance data.

12. The management computer according to claim 8,
wherein when first data storage apparatus receives the write request addressed to the virtualized data volume from the host computer, the first data storage apparatus forwards the write request to the second processor of the second data storage apparatus to write the data in the logical data volume without executing the write request in the virtualized data volume.

13. The management computer according to claim 8,
wherein the first data storage apparatus configures another RAID group with a plurality of the second disk drives, and provides the another RAID group including at least one third logical data volume,
wherein the third logical data volume is configured to store data which is required to be written by the host computer,
wherein the third processor acquires the virtualized data volume configuration table that is stored in the at least one first data storage apparatus, and
wherein the third processor specifies the virtualized data volume, the third logical data volume, the second disk drive, at least one of the ports of the first and second interfaces, and the RAID group, which are linked into the transmission path of the data required to be written in the third data volume by the host computer, from the structural elements of the first data storage apparatus on the basis of the virtualized data volume configuration table.

14. The management computer according to claim 8,
wherein the first data storage apparatus configures another RAID group with a plurality of the second disk drives, and provides the another RAID group to the host computer as the virtualized data volume,
wherein the first data storage apparatus copies the data that is stored in the virtualized data volume into the logical data volume of the second data storage apparatus, and
wherein the third processor specifies the virtualized data volume, the logical data volume, the first disk drive, the second disk drive, at least one of the ports of the first and second interfaces, the another RAID group, and the RAID group, which exist on a transmission path of the copied data that is transmitted to the second data storage apparatus from the first data storage apparatus, from the structural elements of the first data storage apparatus and the second data storage apparatus.

* * * * *